United States Patent
Collinson et al.

(10) Patent No.: US 12,077,876 B2
(45) Date of Patent: Sep. 3, 2024

(54) SYSTEM FOR RELIABLE, HIGH THROUGHPUT, COMPLEX ELECTRIC FIELD GENERATION, AND METHOD FOR PRODUCING COATINGS THEREFROM

(71) Applicant: Modumetal, Inc., Snohomish, WA (US)

(72) Inventors: Leslie Ann Collinson, Seattle, WA (US); John Thomas Cox, Issaquah, WA (US); Shamus F. Patry, Redmond, WA (US)

(73) Assignee: Modumetal, Inc., Snohomish, WA (US)

( * ) Notice: Subject to any disclaimer, the term of this patent is extended or adjusted under 35 U.S.C. 154(b) by 3 days.

(21) Appl. No.: 17/409,688

(22) Filed: Aug. 23, 2021

(65) Prior Publication Data

US 2022/0081798 A1    Mar. 17, 2022

Related U.S. Application Data

(63) Continuation of application No. 16/332,786, filed as application No. PCT/US2017/051606 on Sep. 14, 2017, now abandoned.

(Continued)

(51) Int. Cl.
*C25D 21/12* (2006.01)
*C25D 5/18* (2006.01)
(Continued)

(52) U.S. Cl.
CPC .............. *C25D 21/12* (2013.01); *C25D 5/18* (2013.01); *C25D 17/10* (2013.01); *G01N 27/42* (2013.01)

(58) Field of Classification Search
CPC .................................. C25D 21/12; C25D 5/18
See application file for complete search history.

(56) References Cited

U.S. PATENT DOCUMENTS

| 1,733,404 A | 10/1929 | Fahrenwald |
| 1,982,009 A | 11/1934 | McKinney et al. |

(Continued)

FOREIGN PATENT DOCUMENTS

| CN | 1236024 A | 11/1999 |
| CN | 1380446 A | 11/2002 |

(Continued)

OTHER PUBLICATIONS

SU 377438 A—abstract and original (Year: 1973).*

(Continued)

*Primary Examiner* — Nicholas A Smith
(74) *Attorney, Agent, or Firm* — Seed IP Law Group LLP

(57) ABSTRACT

Embodiments of the present disclosure include a system for depositing a layered nanolaminate alloy including a controller for an electrodeposition process that includes a waveform synthesizer circuit configured to generate a complex waveform signal corresponding to a desired electrodeposition waveform to be output from an electrodeposition power supply. The controller also includes a synthesizer control circuit configured to control the waveform synthesizer circuit. Based at least in part on a recipe having information related to the electrodeposition process, the synthesizer control circuit controls the generation of the complex waveform signal by modulating in real-time at least one of a waveform shape, a frequency, an amplitude, an offset, a slew, a wavelength, a phase, a velocity, and a derivative of the complex waveform signal. The controller further includes a controller output circuit configured to transmit the complex waveform signal to an input of the electrodeposition power supply.

22 Claims, 7 Drawing Sheets

Related U.S. Application Data

(60) Provisional application No. 62/394,552, filed on Sep. 14, 2016.

(51) Int. Cl.
*C25D 17/10* (2006.01)
*G01N 27/42* (2006.01)

(56) References Cited

U.S. PATENT DOCUMENTS

| | | |
|---|---|---|
| 2,428,033 A | 9/1947 | Nachtman |
| 2,436,316 A | 2/1948 | Lum et al. |
| 2,470,775 A | 5/1949 | Jernstedt et al. |
| 2,558,090 A | 6/1951 | Jernstedt |
| 2,642,654 A | 6/1953 | Ahrens |
| 2,678,909 A | 5/1954 | Jernstedt et al. |
| 2,694,743 A | 11/1954 | Ruskin et al. |
| 2,706,170 A | 4/1955 | Marchese |
| 2,891,309 A | 6/1959 | Fenster |
| 3,090,733 A | 5/1963 | Brown |
| 3,255,781 A | 6/1966 | Gillespie, Jr. |
| 3,282,810 A | 11/1966 | Odekerken |
| 3,355,374 A | 11/1967 | Brewer et al. |
| 3,359,469 A | 12/1967 | Levy et al. |
| 3,362,851 A | 1/1968 | Dunster |
| 3,483,113 A | 12/1969 | Carter |
| 3,549,505 A | 12/1970 | Hanusa |
| 3,616,286 A | 10/1971 | Aylward et al. |
| 3,633,520 A | 1/1972 | Stiglich, Jr. |
| 3,669,865 A | 6/1972 | Semienko et al. |
| 3,673,073 A | 6/1972 | Tobey et al. |
| 3,716,464 A | 2/1973 | Kovac et al. |
| 3,753,664 A | 8/1973 | Klingenmaier et al. |
| 3,759,799 A | 9/1973 | Reinke |
| 3,787,244 A | 1/1974 | Schulmeister et al. |
| 3,866,289 A | 2/1975 | Brown et al. |
| 3,941,674 A | 5/1976 | Vanmunster |
| 3,994,694 A | 11/1976 | Clauss et al. |
| 3,996,114 A | 12/1976 | Ehrsam |
| 4,053,371 A | 10/1977 | Towsley |
| 4,105,526 A | 8/1978 | Lewellen, Jr. et al. |
| 4,107,003 A | 8/1978 | Anselrode |
| 4,125,447 A | 11/1978 | Bachert |
| 4,191,617 A | 3/1980 | Hurley et al. |
| 4,204,918 A | 5/1980 | McIntyre et al. |
| 4,216,272 A | 8/1980 | Clauss |
| 4,246,057 A | 1/1981 | Janowski et al. |
| 4,269,672 A | 5/1981 | Inoue |
| 4,284,688 A | 8/1981 | Stücheli et al. |
| 4,314,893 A | 2/1982 | Clauss |
| 4,405,427 A | 9/1983 | Byrd |
| 4,422,907 A | 12/1983 | Birkmaier et al. |
| 4,461,680 A | 7/1984 | Lashmore |
| 4,464,232 A | 8/1984 | Wakano et al. |
| 4,510,209 A | 4/1985 | Hada et al. |
| 4,519,878 A | 5/1985 | Hara et al. |
| 4,529,492 A | 7/1985 | Buchholz et al. |
| 4,540,472 A | 9/1985 | Johnson et al. |
| 4,543,300 A | 9/1985 | Hara et al. |
| 4,543,803 A | 10/1985 | Keyasko |
| 4,591,418 A | 5/1986 | Snyder |
| 4,592,808 A | 6/1986 | Doubt |
| 4,597,836 A | 7/1986 | Schaer et al. |
| 4,613,388 A | 9/1986 | Walter et al. |
| 4,620,661 A | 11/1986 | Slatterly |
| 4,652,348 A | 3/1987 | Yahalom et al. |
| 4,666,567 A | 5/1987 | Loch |
| 4,670,356 A | 6/1987 | Sato et al. |
| 4,678,552 A | 7/1987 | Chen |
| 4,678,721 A | 7/1987 | den Broeder et al. |
| 4,702,802 A | 10/1987 | Umino et al. |
| H543 H | 11/1988 | Chen et al. |
| 4,795,735 A | 1/1989 | Liu et al. |
| 4,834,845 A | 5/1989 | Muko et al. |
| 4,839,214 A | 6/1989 | Oda et al. |
| 4,869,971 A | 9/1989 | Nee et al. |
| 4,885,215 A | 12/1989 | Yoshioka et al. |
| 4,904,542 A | 2/1990 | Mroczkowski |
| 4,904,543 A | 2/1990 | Sakakima et al. |
| 4,909,917 A | 3/1990 | Harrison et al. |
| 4,923,574 A | 5/1990 | Cohen |
| 4,975,337 A | 12/1990 | Hyner et al. |
| 4,978,431 A | 12/1990 | Brannan et al. |
| 5,043,230 A | 8/1991 | Jagannathan et al. |
| 5,045,356 A | 9/1991 | Uemura et al. |
| 5,056,936 A | 10/1991 | Mahrus et al. |
| 5,059,493 A | 10/1991 | Takahata |
| 5,073,237 A | 12/1991 | Bacher et al. |
| 5,079,039 A | 1/1992 | Heraud et al. |
| 5,096,564 A | 3/1992 | Jowitt et al. |
| 5,156,729 A | 10/1992 | Mahrus et al. |
| 5,156,899 A | 10/1992 | Kistrup et al. |
| 5,158,653 A | 10/1992 | Lashmore et al. |
| 5,190,637 A | 3/1993 | Guckel |
| 5,228,967 A | 7/1993 | Crites et al. |
| 5,234,562 A | 8/1993 | Uenishi et al. |
| 5,268,235 A | 12/1993 | Lashmore et al. |
| 5,300,165 A | 4/1994 | Sugikawa |
| 5,320,719 A | 6/1994 | Lasbmore et al. |
| 5,326,454 A | 7/1994 | Engelhaupt |
| 5,352,266 A | 10/1994 | Erb et al. |
| 5,364,523 A | 11/1994 | Tanaka et al. |
| 5,378,583 A | 1/1995 | Guckel et al. |
| 5,413,874 A | 5/1995 | Moysan, III et al. |
| 5,431,800 A | 7/1995 | Kirchhoff et al. |
| 5,461,769 A | 10/1995 | McGregor |
| 5,472,795 A | 12/1995 | Atita |
| 5,489,488 A | 2/1996 | Asai et al. |
| 5,500,600 A | 3/1996 | Moyes |
| 5,547,096 A | 4/1996 | Kleyn |
| 5,527,445 A | 6/1996 | Palumbo |
| 5,545,435 A | 8/1996 | Steffier |
| 5,620,800 A | 4/1997 | De Leeuw et al. |
| 5,660,704 A | 8/1997 | Murase |
| 5,679,232 A | 10/1997 | Fedor et al. |
| 5,738,951 A | 4/1998 | Goujard et al. |
| 5,742,471 A | 4/1998 | Barbee, Jr. et al. |
| 5,775,402 A | 7/1998 | Sachs et al. |
| 5,783,259 A | 7/1998 | McDonald |
| 5,798,033 A | 8/1998 | Uemiya et al. |
| 5,800,930 A | 9/1998 | Chen et al. |
| 5,828,526 A | 10/1998 | Kagawa et al. |
| 5,912,069 A | 6/1999 | Yializis et al. |
| 5,930,085 A | 7/1999 | Kitade et al. |
| 5,942,096 A | 8/1999 | Ruzicka et al. |
| 5,952,111 A | 9/1999 | Sugg et al. |
| 5,958,604 A | 9/1999 | Riabkov et al. |
| 6,036,832 A | 3/2000 | Knol et al. |
| 6,036,833 A | 3/2000 | Tang et al. |
| 6,071,398 A | 6/2000 | Martin et al. |
| 6,143,424 A | 11/2000 | Jonte et al. |
| 6,143,430 A | 11/2000 | Miyasaka et al. |
| 6,193,858 B1 | 2/2001 | Hradil et al. |
| 6,200,452 B1 | 3/2001 | Angelini |
| 6,203,936 B1 | 3/2001 | Cisar et al. |
| 6,212,078 B1 | 4/2001 | Hunt et al. |
| 6,214,473 B1 | 4/2001 | Hunt et al. |
| 6,284,357 B1 | 9/2001 | Lackey et al. |
| 6,312,579 B1 | 11/2001 | Bank et al. |
| 6,344,123 B1 | 2/2002 | Bhatnagar |
| 6,355,153 B1 | 3/2002 | Uzoh et al. |
| 6,398,937 B1 | 6/2002 | Menini et al. |
| 6,409,907 B1 | 6/2002 | Braun et al. |
| 6,415,942 B1 | 7/2002 | Fenton et al. |
| 6,461,678 B1 | 10/2002 | Chen et al. |
| 6,466,417 B1 | 10/2002 | Gill |
| 6,468,672 B1 | 10/2002 | Donovan, III et al. |
| 6,482,298 B1 | 11/2002 | Bhatnagar |
| 6,537,683 B1 | 3/2003 | Staschko et al. |
| 6,547,944 B2 | 4/2003 | Schreiber et al. |
| 6,592,739 B1 | 7/2003 | Sonoda et al. |
| 6,725,916 B2 | 4/2004 | Gray et al. |
| 6,739,028 B2 | 5/2004 | Sievenpiper et al. |
| 6,777,831 B2 | 8/2004 | Gutiérrez, Jr. et al. |

(56) References Cited

U.S. PATENT DOCUMENTS

| | | |
|---|---|---|
| 6,800,121 B2 | 10/2004 | Shahin |
| 6,884,499 B2 | 4/2005 | Penich et al. |
| 6,902,827 B2 | 6/2005 | Kelly et al. |
| 6,908,667 B2 | 6/2005 | Christ et al. |
| 6,923,898 B2 | 8/2005 | Yoshimura et al. |
| 6,979,490 B2 | 12/2005 | Steffier |
| 7,285,202 B2 | 10/2007 | Rumpf |
| 7,581,933 B2 | 9/2009 | Bruce et al. |
| 7,632,590 B2 | 12/2009 | Punsalan et al. |
| 7,736,753 B2 | 6/2010 | Deligianni et al. |
| 8,084,564 B2 | 12/2011 | Kano et al. |
| 8,128,752 B2 | 3/2012 | Kim |
| 8,152,985 B2 | 4/2012 | Macary |
| 8,177,945 B2 | 5/2012 | Arvin et al. |
| 8,192,608 B2 | 6/2012 | Matthews |
| 8,253,035 B2 | 8/2012 | Matsumoto |
| 8,293,077 B2 | 10/2012 | Vacheron |
| 8,585,875 B2 | 11/2013 | Cummings et al. |
| 8,617,456 B1 | 12/2013 | Pechenik et al. |
| 8,814,437 B2 | 8/2014 | Braun |
| 8,871,065 B2 | 10/2014 | Vacheron |
| 8,916,001 B2 | 12/2014 | Pryce Lewis et al. |
| 9,005,420 B2 | 4/2015 | Tomantschger et al. |
| 9,056,405 B2 | 6/2015 | Sato et al. |
| 9,080,692 B2 | 7/2015 | Tomomori et al. |
| 9,108,506 B2 | 8/2015 | Whitaker et al. |
| 9,115,439 B2 | 8/2015 | Whitaker |
| 9,234,294 B2 | 1/2016 | Whitaker et al. |
| 9,273,932 B2 | 3/2016 | Whitaker et al. |
| 9,732,433 B2 | 8/2017 | Caldwell et al. |
| 9,758,891 B2 | 9/2017 | Bao |
| 9,783,907 B2 | 10/2017 | Cai et al. |
| 9,938,629 B2 | 4/2018 | Whitaker et al. |
| 10,041,185 B2 | 8/2018 | Sukenari |
| 10,253,419 B2 | 4/2019 | Lomasney |
| 10,266,957 B2 | 4/2019 | Sugawara et al. |
| 10,472,727 B2 | 11/2019 | Lomasney |
| 10,513,791 B2 | 12/2019 | Lomasney et al. |
| 10,544,510 B2 | 1/2020 | Lomasney |
| 10,662,542 B2 | 5/2020 | Caldwell et al. |
| 10,689,773 B2 | 6/2020 | Whitaker et al. |
| 10,695,797 B2 | 6/2020 | Andreae et al. |
| 10,781,524 B2 | 9/2020 | Whitaker et al. |
| 10,808,322 B2 | 10/2020 | Whitaker et al. |
| 10,844,504 B2 | 11/2020 | Sklar |
| 10,851,464 B1 | 12/2020 | Kobayashi et al. |
| 10,961,635 B2 | 3/2021 | Whitaker |
| 11,118,280 B2 | 9/2021 | Lomasney et al. |
| 11,168,408 B2 | 11/2021 | Sklar |
| 11,180,864 B2 | 11/2021 | Lomasney |
| 11,242,613 B2 | 2/2022 | Lomasney |
| 11,286,575 B2 | 3/2022 | Lomasney et al. |
| 11,293,272 B2 | 4/2022 | Lomasney |
| 11,365,488 B2 | 6/2022 | Morgan et al. |
| 11,519,093 B2 | 12/2022 | Lomasney et al. |
| 11,560,629 B2 | 1/2023 | Whitaker et al. |
| 2001/0003384 A1 | 6/2001 | Morita |
| 2001/0037944 A1 | 11/2001 | Sanada et al. |
| 2002/0011419 A1 | 1/2002 | Arao et al. |
| 2002/0070118 A1 | 6/2002 | Schreiber et al. |
| 2002/0100858 A1 | 8/2002 | Weber |
| 2002/0179449 A1 | 12/2002 | Domeier et al. |
| 2003/0134142 A1 | 7/2003 | Ivey et al. |
| 2003/0234181 A1 | 12/2003 | Palumbo |
| 2003/0236163 A1 | 12/2003 | Chaturvedi et al. |
| 2004/0027715 A1 | 2/2004 | Hixson-Goldsmith et al. |
| 2004/0031691 A1 | 2/2004 | Kelly et al. |
| 2004/0067314 A1 | 4/2004 | Joshi et al. |
| 2004/0154925 A1 | 8/2004 | Podlaha et al. |
| 2004/0178076 A1 | 9/2004 | Stonas et al. |
| 2004/0211672 A1 | 10/2004 | Ishigami et al. |
| 2004/0232005 A1 | 11/2004 | Hubel |
| 2004/0234683 A1 | 11/2004 | Tanaka et al. |
| 2004/0239836 A1 | 12/2004 | Chase |
| 2004/0245093 A1* | 12/2004 | Hubel ............... C25D 21/12 204/198 |
| 2005/0002228 A1 | 1/2005 | Dieny et al. |
| 2005/0109433 A1 | 5/2005 | Danger et al. |
| 2005/0181192 A1 | 8/2005 | Steffier |
| 2005/0183959 A1* | 8/2005 | Wilson ............... C25D 7/123 205/157 |
| 2005/0205425 A1 | 9/2005 | Palumbo et al. |
| 2005/0221100 A1 | 10/2005 | Kirihara et al. |
| 2005/0279640 A1 | 12/2005 | Shimoyama et al. |
| 2006/0065533 A1 | 3/2006 | Inoue et al. |
| 2006/0135281 A1 | 6/2006 | Palumbo et al. |
| 2006/0135282 A1 | 6/2006 | Palumbo et al. |
| 2006/0201817 A1 | 9/2006 | Guggemos et al. |
| 2006/0243597 A1 | 11/2006 | Matefi-Tempfli et al. |
| 2006/0269770 A1 | 11/2006 | Cox et al. |
| 2006/0272949 A1 | 12/2006 | Detor et al. |
| 2006/0286348 A1 | 12/2006 | Sauer |
| 2007/0158204 A1 | 7/2007 | Taylor et al. |
| 2007/0269648 A1 | 11/2007 | Schuh et al. |
| 2007/0278105 A1 | 12/2007 | Ettel |
| 2008/0063866 A1 | 3/2008 | Allen et al. |
| 2008/0093221 A1 | 4/2008 | Basol |
| 2008/0102360 A1 | 5/2008 | Stimits et al. |
| 2008/0226976 A1 | 9/2008 | Stimits |
| 2008/0245669 A1 | 10/2008 | Yoshioka et al. |
| 2008/0271995 A1 | 11/2008 | Savastiouk et al. |
| 2008/0283236 A1 | 11/2008 | Akers et al. |
| 2009/0004465 A1 | 1/2009 | Kano et al. |
| 2009/0084933 A1 | 4/2009 | Appleby et al. |
| 2009/0101511 A1 | 4/2009 | Lochtman et al. |
| 2009/0114530 A1 | 5/2009 | Noda et al. |
| 2009/0130424 A1 | 5/2009 | Tholen et al. |
| 2009/0130425 A1 | 5/2009 | Whitaker |
| 2009/0130479 A1 | 5/2009 | Detor et al. |
| 2009/0139870 A1 | 6/2009 | Nagai et al. |
| 2009/0155617 A1 | 6/2009 | Kim et al. |
| 2009/0283410 A1 | 11/2009 | Sklar et al. |
| 2010/0078330 A1 | 4/2010 | Hyodo |
| 2010/0116675 A1 | 5/2010 | Sklar et al. |
| 2010/0187117 A1 | 7/2010 | Lingenfelter et al. |
| 2010/0304063 A1 | 12/2010 | McCrea et al. |
| 2010/0304179 A1 | 12/2010 | Facchini et al. |
| 2010/0319757 A1 | 12/2010 | Oetting |
| 2011/0111296 A1 | 5/2011 | Berdichevsky et al. |
| 2011/0162970 A1 | 7/2011 | Sato |
| 2011/0180413 A1 | 7/2011 | Whitaker et al. |
| 2011/0186582 A1 | 8/2011 | Whitaker et al. |
| 2011/0256356 A1 | 10/2011 | Tomantschger et al. |
| 2011/0277313 A1 | 11/2011 | Soracco et al. |
| 2012/0118745 A1 | 5/2012 | Bao |
| 2012/0135270 A1 | 5/2012 | Wilbuer et al. |
| 2012/0231574 A1 | 9/2012 | Wang |
| 2012/0282417 A1 | 11/2012 | Garcia et al. |
| 2013/0052343 A1 | 2/2013 | Dieny et al. |
| 2013/0071755 A1 | 3/2013 | Oguro |
| 2013/0075264 A1 | 3/2013 | Cummings et al. |
| 2013/0130057 A1 | 5/2013 | Caldwell et al. |
| 2013/0186852 A1 | 7/2013 | Dietrich et al. |
| 2013/0220831 A1 | 8/2013 | Vidaurre Heiremans et al. |
| 2013/0224008 A1 | 8/2013 | Cheung et al. |
| 2013/0323473 A1 | 12/2013 | Dietsch et al. |
| 2014/0163717 A1 | 6/2014 | Das et al. |
| 2014/0178637 A1 | 6/2014 | Rajagopalan et al. |
| 2014/0231266 A1 | 8/2014 | Sherrer et al. |
| 2014/0272458 A1 | 9/2014 | Ruan et al. |
| 2015/0315716 A1 | 11/2015 | Whitaker |
| 2015/0322588 A1 | 11/2015 | Lomasney et al. |
| 2016/0002790 A1 | 1/2016 | Whitaker et al. |
| 2016/0002803 A1 | 1/2016 | Sklar |
| 2016/0002806 A1 | 1/2016 | Lomasney |
| 2016/0002813 A1 | 1/2016 | Lomasney |
| 2016/0027425 A1 | 1/2016 | Cook et al. |
| 2016/0047980 A1 | 2/2016 | Page et al. |
| 2016/0145850 A1 | 5/2016 | Cook et al. |
| 2016/0159488 A1 | 6/2016 | Roach et al. |
| 2016/0160863 A1 | 6/2016 | Roach et al. |
| 2016/0214283 A1 | 7/2016 | Schick et al. |
| 2016/0298251 A1 | 10/2016 | Kimoto et al. |

(56) References Cited

U.S. PATENT DOCUMENTS

| | | |
|---|---|---|
| 2017/0016130 A1 | 1/2017 | Testoni et al. |
| 2017/0191179 A1 | 7/2017 | Sklar |
| 2017/0275775 A1 | 9/2017 | Guadarrama Calderon et al. |
| 2018/0016694 A1 | 1/2018 | Bao |
| 2018/0066375 A1 | 3/2018 | Morgan et al. |
| 2018/0071980 A1 | 3/2018 | Lomasney et al. |
| 2018/0245229 A1 | 8/2018 | Whitaker et al. |
| 2019/0309430 A1 | 10/2019 | Sklar |
| 2019/0360116 A1 | 11/2019 | Collinson et al. |
| 2020/0115998 A1 | 4/2020 | Lomasney |
| 2020/0131658 A1 | 4/2020 | Lomasney et al. |
| 2020/0173032 A1 | 6/2020 | Lomasney |
| 2020/0277706 A1 | 9/2020 | Lomasney et al. |
| 2020/0283923 A1 | 9/2020 | Lomasney |
| 2020/0318245 A1 | 10/2020 | Lomasney |
| 2020/0354846 A1 | 11/2020 | Whitaker et al. |
| 2020/0392642 A1 | 12/2020 | Lomasney |
| 2021/0054522 A1 | 2/2021 | Lomasney et al. |
| 2021/0071303 A1 | 3/2021 | Whitaker et al. |
| 2021/0147995 A1 | 5/2021 | Sklar |
| 2022/0081798 A1 | 3/2022 | Collinson et al. |
| 2022/0154357 A1 | 5/2022 | Lomasney |
| 2022/0396893 A1 | 12/2022 | Lomasney et al. |

FOREIGN PATENT DOCUMENTS

| | | | |
|---|---|---|---|
| CN | 1924110 A | 3/2007 | |
| CN | 101113527 A | 1/2008 | |
| CN | 101195924 A | 6/2008 | |
| CN | 201857434 U | 6/2011 | |
| CN | 102148339 A | 8/2011 | |
| CN | 203584787 U | 5/2014 | |
| CN | 105442011 A | 3/2016 | |
| DE | 39 02 057 A1 | 7/1990 | |
| DE | 19913273 A1 * | 9/2000 | C25D 21/12 |
| DE | 10 2004 006 441 A1 | 12/2005 | |
| EP | 1 688 518 A2 | 8/2006 | |
| EP | 2 189 554 A1 | 5/2010 | |
| EP | 2 544 282 A1 | 1/2013 | |
| JP | 47-2005 A | 2/1972 | |
| JP | 47-33925 A | 11/1972 | |
| JP | 52-109439 A | 9/1977 | |
| JP | 58-197292 A | 11/1983 | |
| JP | 60-97774 A | 5/1985 | |
| JP | 61-99692 A | 5/1986 | |
| JP | 1-132793 A | 5/1989 | |
| JP | 2-214618 A | 8/1990 | |
| JP | 5-251849 A | 9/1993 | |
| JP | 6-196324 A | 7/1994 | |
| JP | 7-065347 A | 3/1995 | |
| JP | H09-119000 A | 5/1997 | |
| JP | 2000-239888 A | 9/2000 | |
| JP | 2001-152388 A | 6/2001 | |
| JP | 2001-181893 A | 7/2001 | |
| JP | 2002-53999 A | 2/2002 | |
| JP | 2006-035176 A | 2/2006 | |
| JP | 2009-215590 A | 9/2009 | |
| JP | 2015537123 A * | 12/2015 | C25D 5/18 |
| KR | 2003-0092463 A | 12/2003 | |
| KR | 20-2010-0009670 U | 10/2010 | |
| KR | 10-2015-0132043 A | 11/2015 | |
| SU | 36121 A1 | 4/1934 | |
| WO | 83/02784 A1 | 8/1983 | |
| WO | 95/14116 A1 | 5/1995 | |
| WO | 02/33150 A2 | 4/2002 | |
| WO | 2004/001100 A1 | 12/2003 | |
| WO | 2005/026415 A1 | 3/2005 | |
| WO | 2007/045466 A1 | 4/2007 | |
| WO | 2007/136387 A1 | 11/2007 | |
| WO | 2007/138619 A1 | 12/2007 | |
| WO | 2008/057401 A2 | 5/2008 | |
| WO | 2009/045433 A1 | 4/2009 | |
| WO | 2010/124301 A2 | 10/2010 | |
| WO | 2010/144509 A2 | 12/2010 | |
| WO | 2011/033775 A1 | 3/2011 | |
| WO | 2011/110346 A2 | 9/2011 | |
| WO | 2012/145750 A2 | 10/2012 | |
| WO | 2013/133762 A1 | 9/2013 | |
| WO | 2017/097300 A1 | 6/2017 | |

OTHER PUBLICATIONS

"Appendix 1: Literature review (Task 1): Literature review concerning the improvement of galvanneal (GA) coating adherence during shear test of adhesively bonded GA steel sheets," 70 pages, no date.

"Designing with Metals: Dissimilar Metals and the Galvanic Series," printed Oct. 5, 2017, 3 pages.

"Improvement of Galvanneal Coating Adherence on Advanced High Strength Steel," Appendix 1: Literature review (Task 1), Progress Report No. 1 to Galvanized Autobody Partnership Program of International Zinc Association, Brussels, Belgium, Jun. 2008-Jul. 2009, 70 pages, Issued: Sep. 2009.

"Low-temperature iron plating," web blog article found at http:blog.sina.com.cn/s/blog_48ed0a9c0100024z.html, published Mar. 22, 2006, 3 pages. (with English translation).

Adams et al., "Controlling strength and toughness of multilayer films: a new multiscalar approach," *J. Appl. Phys.* 74(2):1015-1021, 1993.

Aizenberg et al., "Skeleton of *Euplectella* sp.: Structural Hierarchy from the Nanoscale to the Macroscale," *Science* 309:275-278, 2005.

Alfantazi et al., "Synthesis of nanocrystalline Zn—Ni alloy coatings," *JMSLD5* 15(15):1361-1363, 1996.

Atanassov et al., "Electrodeposition and properties of nickel-manganese layers," *Surface and Coatings Technology* 78:144-149, 1996.

Bakonyi et al., "Electrodeposited multilayer films with giant magnetoresistance (*GMR*): Progress and problems," *Progress in Materials Science* 55:107-245, 2010.

Bartlett et al., "Electrochemical deposition of macroporous platinum, palladium and cobalt films using polystyrene latex sphere templates," *Chem. Commun.*, pp. 1671-1672, 2000.

Beattie et al., "Comparison of Electrodeposited Copper-Zinc Alloys Prepared Individually and Combinatorially," *J. Electrochem. Soc.* 150(11):C802-C806, 2003.

Bird et al., "Giant Magnetoresistance in Electrodeposited Ni/Cu and Co/Cu Multilayers," *J. Electrochem. Soc.* 142(4):L65-L66, 1995.

Blum, "The Structure and Properties of Alternately Electrodeposited Metals," presented at the Fortieth General Meeting of the American Electrochemical Society, Lake Placid, New York, Oct. 1, 1921, 14 pages.

Cohen et al., "Electroplating of Cyclic Multilayered Alloy (CMA) Coatings," *J. Electrochem. Soc.* 130(10):1987-1995, 1983.

Cowles, "High cycle fatigue in aircraft gas turbines—an industry perspective," *International Journal of Fracture* 80(2-3):147-163, 1996.

Despic et al., "Electrochemical Formation of Laminar Deposits of Controlled Structure and Composition," *J. Electrochem. Soc.* 136(6):1651-1657, 1989.

Dini et al. "On the High Temperature Ductility Properties of Electrodeposited Sulfamate Nickel," *Plating and Surface Finishing* 65(2):36-40, 1978.

Etminanfar et al., "Corrosion resistance of multilayer coatings of nanolayered Cr/Ni electrodeposited from Cr(III)—Ni(II) bath," *Thin Solid Films* 520:5322-5327, 2012.

Gasser et al., "Materials Design for Acoustic Liners: an Example of Tailored Multifunctional Materials," *Advanced Engineering Materials* 6(1-2):97-102, 2004.

Georgescu et al., "Magnetic Behavior of [Ni/Co—Ni—Mg—N] ×n Cylindrical Multilayers prepared by Magnetoelectrolysis," *Phys. Stat. Sol. (a)* 189(3):1051-1055, 2002.

Ghanem et al., "A double templated electrodeposition method for the fabrication of arrays of metal nanodots," *Electrochemistry Communications* 6:447-453, 2004.

Grimmett et al., "Pulsed Electrodeposition of Iron-Nickel Alloys," *J. Electrochem. Soc.* 137(11):3414-3418, 1990.

(56) References Cited

OTHER PUBLICATIONS

Hariyanti, "Electroplating of Cu—Sn Alloys and Compositionally Modulated Multilayers of Cu—Sn—Zn—Ni Alloys on Mild Steel Substrate," Master of Science Thesis, University of Science, Malaysia, Penang, Malaysia, 2007.
Harris et al., "Improved Single Crystal Superalloys, CMSX-4® (SLS)[La+Y] and CMSX-486®," *TMS (The Minerals, Metals& Materials Society), Superalloys*, p. 45-52, 2004.
Huang et al., "Hardness variation and annealing behavior of a Cr—Ni multilayer electroplated in a trivalent chromium-based bath," *Surface and Coatings Technology* 203:3320-3324, 2009.
Huang et al., "Characterization of Cr—Ni multilayers electroplated from a chromium(III)-nickel(II) bath using pulse current," *Scripta Materialia*, 57:61-64, 2007.
Igawa et al., "Fabrication of SiC fiber reinforced SiC composite by chemical vapor infiltration for excellent mechanical properties," *Journal of Physics and Chemistry of Solids* 66:551-554, 2005.
Ivanov et al., "Corrosion resistance of compositionally modulated multilayered Zn—Ni alloys deposited from a single bath," *Journal of Applied Electrochemistry* 33:239-244, 2003.
Jeong et al., "The Effect of Grain Size on the Wear Properties of Electrodeposited Nanocrystalline Nickel Coatings," *Scripta Mater.* 44:493-499, 2001.
Jia et al., "LIGA and Micromolding" Chapter 4, *The MEMS Handbook*, 2nd edition, CRC Press, Boca Raton, Florida, Edited by Mohamed Gad-el-Hak, 2006.
Kalu et al., "Cyclic voltammetric studies of the effects of time and temperature on the capacitance of electrochemically deposited nickel hydroxide," *Journal of Power Sources* 92:163-167, 2001.
Kaneko et al., "Vickers hardness and deformation of Ni/Cu nano-multilayers electrodeposited on copper substrates," Eleventh International Conference on Intergranular and Interphase Boundaries 2004, *Journal of Material Science* 40:3231-3236, 2005.
Karimpoor et al., "Tensile Properties of Bulk Nanocrystalline Hexagonal Cobalt Electrodeposits," *Materials Science Forum* 386-388:415-420, 2002.
Keckes et al., "Cell-wall recovery after irreversible deformation of wood," *Nature Materials* 2:810-814, 2003.
Kirilova et al., "Corrosion behaviour of Zn—Co compositionally modulated multilayers electrodeposited from single and dual baths," *Journal of Applied Electrochemistry* 29:1133-1137, 1999.
Kockar et al., "Effect of potantiostatic waveforms on properties of electrodeposited NiFe alloy films," *Eur. Phys. J. B*(42) :497-501, 2004.
Kruth et al., "Progress in Additive Manufacturing and Rapid Prototyping" *CIRP Annals* 47(2):525-540, 1998.
Lashmore et al., "Electrodeposited Cu—Ni Textured Superlattices," *J. Electrochem. Soc.* 135(5):1218-1221, 1988.
Lashmore et al., "Electrodeposited Multilayer Metallic Coatings," *Encyclopedia of Materials Science and Engineering*, Supp. vol. 1:136-140, 1988.
Leisner et al., "Methods for electrodepositing composition-modulated alloys," *Journal of Materials Processing Technology* 58:39-44, 1996.
Leith et al., "Characterization of Flow-Induced Compositional Structure in Electrodeposited NiFe Composition-Modulated Alloys" *J. Electrochem. Soc.* 145(8):2827-2833, 1998.
Lekka et al., "Corrosion and wear resistant electrodeposited composite coatings," *Electrochimica Acta* 50:4551-4556, 2005.
Lewis et al., "Stability in thin film multilayers and microlaminates: the role of free energy, structure, and orientation at interfaces and grain boundaries," *Scripta Materialia* 48:1079-1085, 2003.
Low et al., "Electrodeposition of composite coatings containing nanoparticles in a metal deposit," *Surface & Coating Technology* 201:371-383, 2006.
Malone, "New Developments in Electroformed Nickel-Based Structural Alloys," *Plating and Surface Finishing* 74(1):50-56, 1987.
Marchese, "Stress Reduction of Electrodeposited Nickel," *Journal of the Electrochemical Society* 99(2):39-43, 1952.
Meng et al., "Fractography, elastic modulus, and oxidation resistance of Novel metal-intermetallic Ni/Ni$_3$Al multilayer films," *J. Mater. Res.* 17(4):790-796, 2002.
Naslain et al., "Synthesis of highly tailored ceramic matrix composites by pressure-pulsed CVI," *Solid State Ionics* 141-142:541-548, 2001.
Naslain, "The design of the fibre-matrix interfacial zone in ceramic matrix composites," *Composites Part A 29A*:1145-1155, 1998.
Nicholls, "Advances in Coating Design for High-Performance Gas Turbines," *MRS Bulletin*, p. 659-670, 2003.
Onoda et al., "Preparation of amorphous/crystalloid soft magnetic multilayer Ni—Co—B alloy films by electrodeposition," *Journal of Magnetism and Magnetic Materials* 126(1-3):595-598, 1993.
Parkin et al., "Oscillations in Exchange Coupling and Magnetoresistance in Metallic Superlattice Structures: Co/Ru, Co/Cr, and Fe/Cr," *Physical Review Letters* 64(19):2304-2307, 1990.
Pilone et al., "Model of Multiple Metal Electrodeposition in Porous Electrodes," *Journal of the Electrochemical Society* 153(5):D85-D90, 2006.
Podlaha et al. "Induced Codeposition: I. an Experimental Investigation of Ni—Mo Alloys," *J. Electrochem. Soc.* 143(3):885-892, 1996.
Ross, "Electrodeposited Multilayer Thin Films," *Annual Review of Materials Science* 24:159-188, 1994.
Rousseau et al., "Single-bath Electrodeposition of Chromium-Nickel Compositionally Modulated Multilayers (CMM) From a Trivalent Chromium Bath," *Plating and Surface Finishing*, p. 106-110, 1999.
Saleh et al., "Effects of electroplating on the mechanical properties of stereolithography and laser sintered parts," *Rapid Prototyping Journal* 10(5)305-315, 2004.
Sanders et al., "Mechanics of hollow sphere foams," *Materials Science and Engineering* A347:70-85, 2003.
Sartwell et al., "Replacement of Chromium Electroplating on Gas Turbine Engine Components Using Thermal Spray Coatings," Report No. NRL/MR/6170-05-8890, Naval Research Laboratory, 2005. (207 pages).
Schwartz, "Multiple-Layer Alloy Plating," ASM Handbook 5: Surface Engineering, p. 274-276, 1994.
Sherik, "Synthesis, Structure and Properties of Electrodeposited Bulk Nanocrystalline Nickel," Master's Thesis, Queen's University, Ontario, Canada, 1993.
Shishkovski, "Laser synthesis of functionally graded meso structures and bulk products," FIZMATLIT, Moscow, Russia, pp. 30-38, 2009. (with English Abstract).
Simunovich et al., "Electrochemically Layered Copper-Nickel Nanocomposites with Enhanced Hardness," *J. Electrochem. Soc.* 141(1):L10-L11, 1994.
Sperling et al., "Correlation of stress state and nanohardness via heat treatment of nickel-aluminide multilayer thin films," *J. Mater. Res.* 19(11):3374-3381, 2004.
Srivastava et al., "Corrosion resistance and microstructure of electrodeposited nickel-cobalt alloy coatings," *Surface & Coatings Technology* 201:3051-3060, 2006.
Stephenson, Jr., "Development and Utilization of a High Strength Alloy for Electroforming," *Plating* 53(2): 183-192, 1966.
Suresh, "Graded Materials for Resistance to Contact Deformation and Damage," *Science* 292:2447-2451, 2001.
Switzer et al., "Electrodeposited Ceramic Superlattices," *Science* 247(4941):444-446, 1990.
Tench et al., "Considerations in Electrodeposition of Compositionally Modulated Alloys," *J. Electrochem. Soc.* 137(10):3061-3066, 1990.
Tench et al., "Enhanced Tensile Strength for Electrodeposited Nickel-Copper Multilayer Composites," *Metallurgical Transactions A* (15A):2039-2040, 1984.
Thangaraj et al., "Corrosion behavior of composition modulated multilayer Zn—Co electrodeposits produced using a single-bath technique," *J. of Appl. Electrochem.* 39:339-345, 2009.
Thangaraj et al., "Surface Modification by Compositionally Modulated Multilayered Zn—Fe Alloy Coatings," *Chinese Journal of Chemistry* 26:2285-2291, 2008.

(56) References Cited

OTHER PUBLICATIONS

Tokarz et al., "Preparation, structural and mechanical properties of electrodeposited Co/Cu multilayers," *phys. stat. sol. (c)* 5(11):3526-3529, 2008.
Touchstone Research Laboratory, Ltd., Material Safety Data Sheet, CFOAM Carbon Foams, 2008. (4 pages).
Vill et al., "Mechanical Properties of Tough Multiscalar Microlaminates," *Acta metall. mater.* 43(2):427-437, 1995.
Voevodin et al., "Superhard, functionally gradient, nanolayered and nanocomposite diamond-like carbon coatings for wear protection," *Diamond and Related Materials* 7:463-467, 1998.
Wearmouth et al., "Electroforming with Heat-Resistant, Sulfur-Hardened Nickel," *Plating and Surface Finishing* 66(10):53-57, 1979.
Weil et al., "Pulsed Electrodeposition of Layered Brass Structures," *Metallurgical Transactions A* 19A:1569-1573, 1988.
Weil et al., "Properties of Composite Electrodeposits," U.S. Army Research Office, Final Report, Contract No. DAAL03-87-K-0047, 21 pages, 1990.
Wikipedia, "Gold," URL= http://en.wikipedia.org/wiki/Gold, version modified Nov. 3, 15 pages, 2008.
Wikipedia, "Silver," URL= http://en.wikipedia.org/wiki/Silver, version modified Nov. 3, 12 pages, 2008.
Wilcox, "Surface Modification With Compositionally Modulated Multilayer Coatings," JCSE, vol. 6 Paper 52, 2004, 5 pages.
Wu et al., "Preparation and characterization of superhard $CN_x$/ZrN multilayers," *J. Vac. Sci. Technol. A* 15(3):946-950, 1997.
Yahalom et al., "Formation of composition-modulated alloys by electrodeposition," *Journal of Materials Science* 22:499-503, 1987.
Yang et al., "Effects of SiC sub-layer on mechanical properties of Tyranno-SA/SiC composites with multiple interlayers," *Ceramics International* 31:525-531, 2005.
Yang et al., "Enhanced elastic modulus in composition-modulated gold-nickel and copper-palladium foils," *Journal of Applied Physics* 48(3):876-879, 1977.
Yogesha et al., "Optimization of deposition conditions for development of high corrosion resistant Zn—Fe multilayer coatings," Journal of Materials Processing Technology, 211 (2011) 1409-1415.
Zabludovsky et al., "The Obtaining of Cobalt Multilayers by Programme-controlled Pulse Current," *Transactions of the Institute of Metal Finishing* 75(5):203-204, 1997.
Paz et al., "Nano-Laminated Alloys for Improved Return on Oilfield Assets," Society of Petroleum Engineers, 2016. (14 pages).
Dulal et al., "Characterisation of Co—Ni(Cu)/Cu multilayers deposited from a citrate electrolyte in a flow channel cell," *Electrochimica Acta* 49:2041-2049, 2004.
Kalantary et al., "Compositionally modulated alloy synthesis by electrochemical deposition," *National UK Corrosion Conference of the Institute of Corrosion, 15th*:223-234, Jan. 1, 1995.
Kalantary et al., "The Production of Compositionally Modulated Alloys by Simulated High Speed Electrodeposition From a Single Solution," *Electrochimica Acta* 40(11):1609-1616, 1995.
Nabiyouni et al., "Growth, characterization and magnetoresistive study of electrodeposited Ni/Cu and Co—Ni/Cu multilayers," *Journal of Crystal Growth* 275:e1259-e1262, 2005.
U.S. Appl. No. 17/179,351, filed Feb. 18, 2021.
U.S. Appl. No. 17/678,841, filed Feb. 23, 2022.

\* cited by examiner

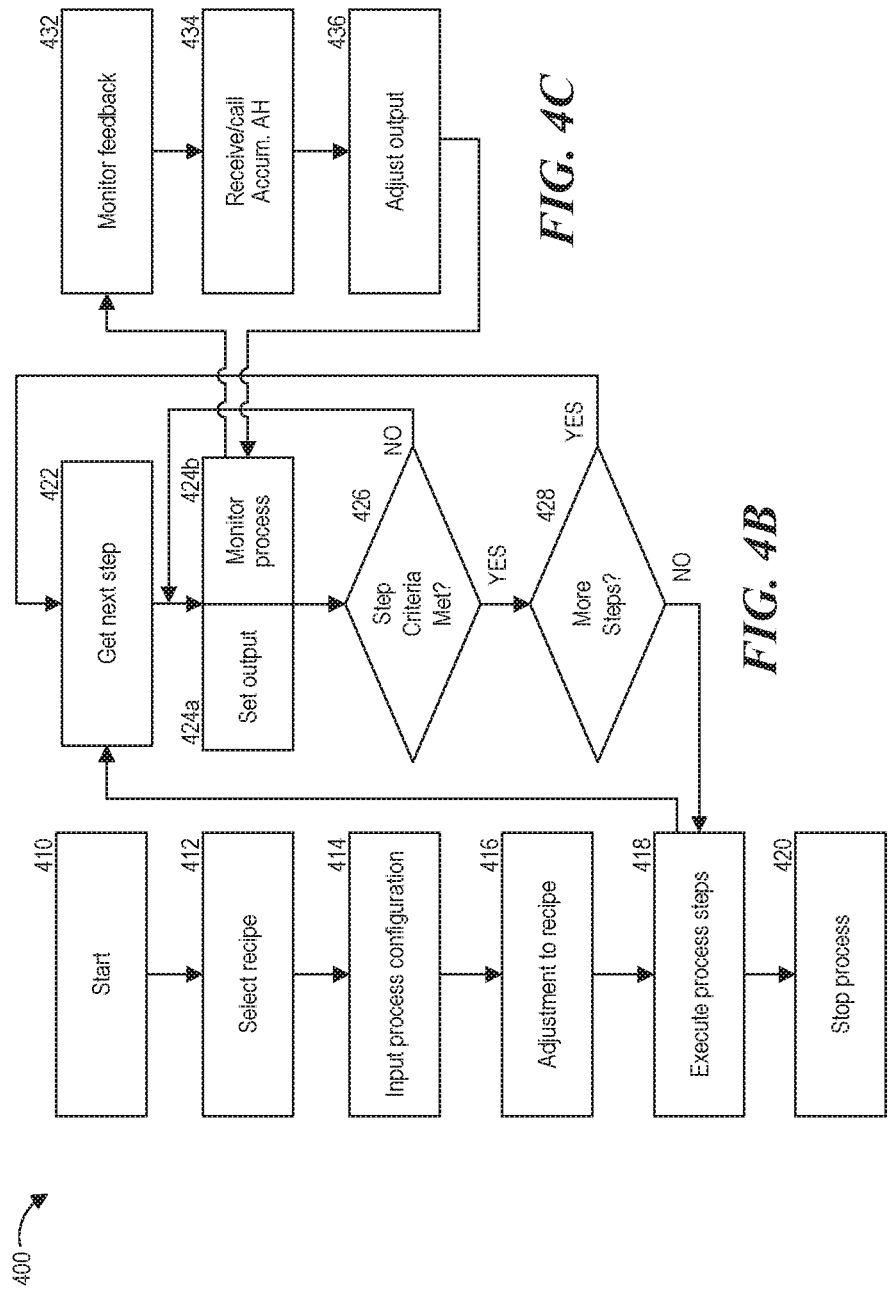

SYSTEM FOR RELIABLE, HIGH THROUGHPUT, COMPLEX ELECTRIC FIELD GENERATION, AND METHOD FOR PRODUCING COATINGS THEREFROM

BACKGROUND

Technical Field

Depositing multilayer nanolaminate coatings on a workpiece via electrochemical manufacturing methods at relatively high rates or throughput requires stable and precise electric field generators (e.g., waveform generators). Additionally, varying the composition and microstructure of the deposited coatings (e.g., deposited species and/or microstructure) requires precise control of the waveform provided (e.g., the current and/or the voltage waveform) to one or more sets of electrodes simultaneously. Further, based on the desired galvanic interaction among or between individual layers of the coating and/or between the coating layers and the workpiece, electrodeposition may require complex features in the waveform and/or the waveform may have to be modified in real-time based on a process step and/or process feedback in order to achieve specific combinations of properties.

Description of the Related Art

Traditional electrodeposition systems typically use current pulses, based on abrupt voltage or current transitions, which limit the degree of precision that can be applied to the electrodeposition process. Although in some related electroplating systems, for example, electroplating systems in the semiconductor industry or coatings industries, the power supplies may include analog circuitry and micro-controllers that are capable of a range of waveforms. However, the range of waveforms in these electroplating systems is limited in both the number of available waveforms and the type of waveforms that can be created. In addition, the types of waveforms that can be created are further limited to pre-loaded full-length waveforms and/or limited to standard waveform profile patterns. That is, the waveforms cannot be modified in real-time. Further, power supplies and controllers in traditional systems typically only control the voltage or current to one pair of electrodes (i.e., an anode and a cathode).

While some traditional systems provide flexibility in the controller by including field-programmable gate arrays, in known power supply systems the controller is required to be connected to a specific bulk power supply or power supplies. That is, each controller is configured to be used with, for example, a power supply of a specific model or a limited range of models, power supplies from a specific manufacturer, and/or power supplies having specific output ranges. This means that a user is required to purchase and learn different software for each power supply. Moreover, known systems have varying degrees of instability, which can adversely affect the coating process. Known systems cannot calibrate for and/or modify the output waveform to account for process instabilities. Accordingly, there is a need for improved power control systems and methods. The present disclosure provides this and related advantages.

BRIEF SUMMARY

In embodiments of the present technology, the power supply systems, which include a controller and a power supply, dynamically generate electrodeposition waveforms having any desired waveform profile (e.g., generate a complex waveform) by modulating or changing in real-time the waveform shape, the frequency, the amplitude, the offset, the slew, the wavelength, the phase, the velocity, the derivative, and/or some other waveform parameter. The desired waveform profile can apply to the voltage and/or the current profile of the electrodeposition waveform. The electrodeposition waveform is then output to a set of electrodes in an electrochemical tank to perform the electrodeposition process.

In embodiments, the present disclosure provides a system, comprising: an electrochemical processing tank; a set of electrodes configured to be used in depositing a multilayer nanolaminate coating on a workpiece; an electrodeposition power supply connected to the set of electrodes, the electrodeposition power supply comprising an input connection configured to receive a complex waveform signal, the electrodeposition power supply configured to amplify the complex waveform signal to generate a desired electrodeposition waveform, the desired electrodeposition waveform configured to deposit at least one layer of the multilayer nanolaminate coating on the workpiece; and a processor-based controller comprising: a waveform synthesizer circuit configured to generate the complex waveform signal; a synthesizer control circuit configured to control the waveform synthesizer circuit based at least in part on a recipe having parameters related to the depositing at least one layer of the multilayer nanolaminate coating, the synthesizer control circuit configured to control the complex waveform signal generated by modulating in real-time a waveform shape, a frequency, an amplitude, an offset, a slew, a wavelength, a phase, a velocity, a derivative of the complex waveform signal, or a combination thereof; and a controller output circuit connected to the input of the electrodeposition power supply, the controller output circuit configured to transmit the complex waveform signal to the input.

In other embodiments, the present disclosure provides a controller for an electrodeposition process, comprising: a waveform synthesizer circuit configured to generate a complex waveform signal corresponding to an electrodeposition waveform, and configured to transmit the complex waveform signal to an electrodeposition power supply; a synthesizer control circuit configured to control the waveform synthesizer circuit based at least in part on a recipe having parameters related to depositing at least one layer of a multilayer nanolaminate coating, the synthesizer control circuit configured to control the complex waveform signal generated by modulating in real-time a waveform shape, a frequency, an amplitude, an offset, a slew, a wavelength, a phase, a velocity, a derivative of the complex waveform signal, or a combination thereof; and a controller output circuit configured to transmit the complex waveform signal to an input of the electrodeposition power supply.

In further embodiments, the present disclosure provides a method for electrodepositing a coating on a workpiece, the method comprising: selecting a recipe corresponding to a electrodeposition process; producing a specialized recipe by adjusting the recipe based on information related to workpiece geometry, workpiece surface area, an electrodeposition power supply, or a combination thereof, generating a complex waveform signal corresponding to a desired electrodeposition waveform that is based on the adjusted recipe, the generating comprising modulating in real-time a waveform shape, a frequency, an amplitude, an offset, a slew, a wavelength, a phase, a velocity, a derivative of the complex waveform signal, or a combination thereof, based at least on the recipe; providing the complex waveform signal to the electrodeposition power supply; generating an electrodeposition waveform based on the complex waveform signal by the power supply; and transmitting the electrodeposition waveform to an electrode set in an electrodeposition processing tank, thereby depositing the coating on the workpiece.

BRIEF DESCRIPTION OF THE SEVERAL VIEWS OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 4A-4C illustrate a high-level overview of the steps for operating a system to perform an electrodeposition process on a workpiece surface.

DETAILED DESCRIPTION

Figure 1:
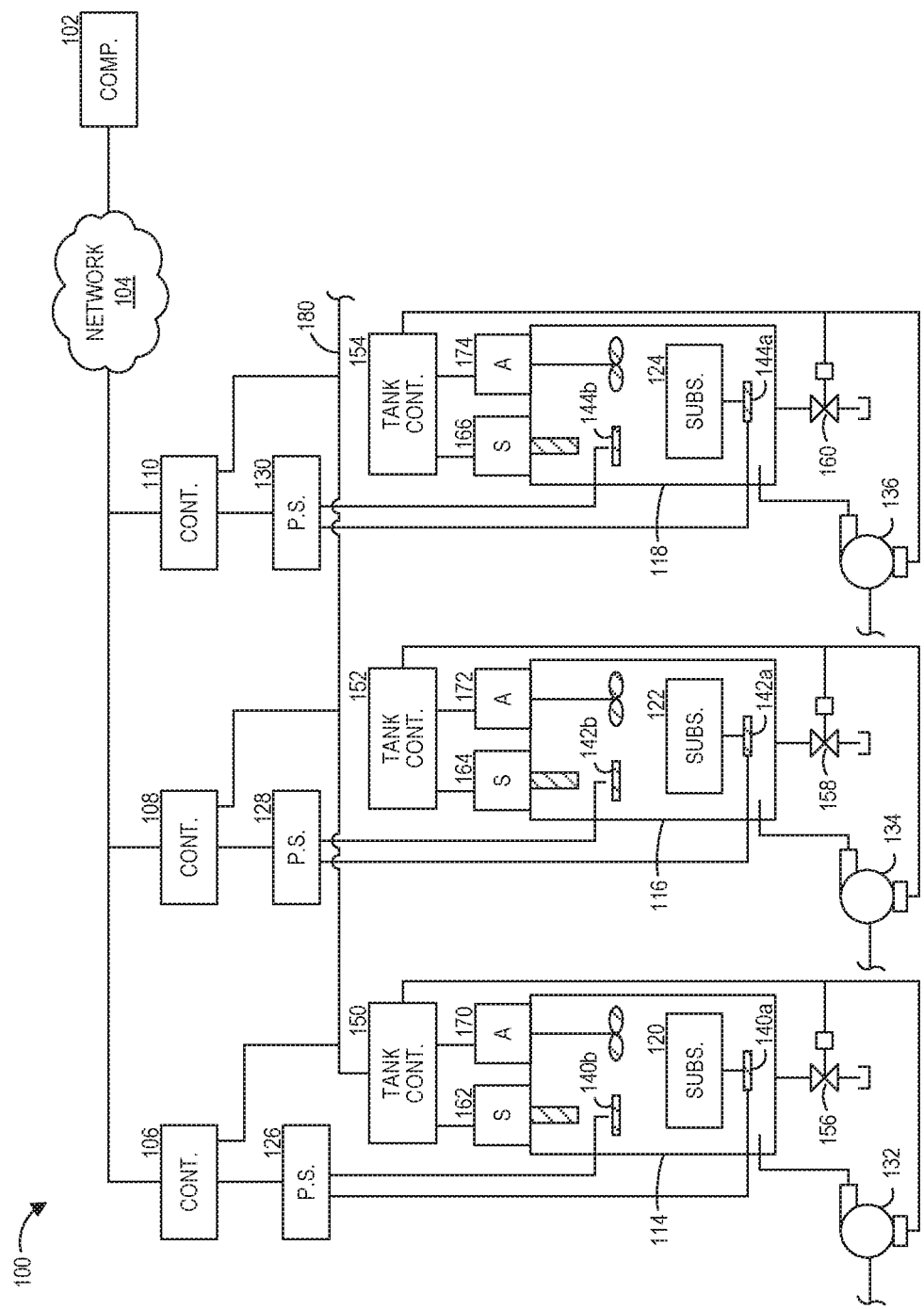
FIG. 1 illustrates an embodiment of an electrodeposition system depicting the control of electrochemical processing tanks via network connected controllers.

Described herein is a system and apparatus for electrodeposition of coating (e.g., a laminated coating) on a workpiece. In embodiments, such systems are used to electrodeposit one or more nanolaminated or microlaminated metal or metal alloy coatings on all or part of a workpiece, e.g., the surface of the workpiece. The workpiece can be an activated workpiece in that it has been prepared (i.e., pretreated) for the deposition process. In some embodiments, the workpiece is activated, at least in part, by electrochemical etching controlled by an etching waveform or a portion of a complex waveform that produces the one or more nanolaminated or microlaminated coatings on the workpiece.

Prior to setting forth this disclosure in more detail, it may be helpful to an understanding thereof to provide definitions of certain terms to be used herein. Additional definitions are set forth throughout this disclosure.

A "set of electrodes" or "electrode set," as used herein, refers to at least one anode and the corresponding at least one cathode. In embodiments, a set of electrodes is an anode/cathode pair. However, in such embodiments, either the anode or the cathode may be common between two or more sets of electrodes. For example, an electrochemical tank can have one, two, three, four, or more anodes and a common cathode, and an "electrode set" may refer to a respective anode in combination with the common cathode. In other embodiments, an electrode set refers to a common cathode that corresponds to a plurality of anodes.

"Electrolyte," as used herein, means an electrolyte bath, plating bath, or electroplating solution from which one or more metals may be electrodeposited.

"Electrodeposition" or "electrodeposited" refers to a process or a resultant product, respectively, in which electrolysis is used to deposit a coating onto a workpiece. In other words, a workpiece is contacted with (e.g., partially immersed in, or fully immersed in) an electrolyte solution containing one or more ions (e.g., metal, ceramic, etc.) while an electric current is passed through the workpiece and the electrolyte solution, resulting in a thin coating being deposited on the surface of the workpiece.

"Coatings" include thin layers that are electrodeposited onto a surface of a workpiece. Therefore "coatings," as used herein, includes claddings, which are made of a series of thin electrodeposited layers on a surface of a mandrel, where the mandrel is removed after formation of the electrodeposited layers. Claddings are generally fastened to another article as a protective layer after formation.

"Laminated," or "laminate" as used herein, refers to materials (e.g., coatings) that comprise two or more layers. In embodiments, laminate or laminated refers to materials that comprise, consist essentially of, or consist of, a series of layers that may be in an alternating or non-alternating pattern. Alternating layers may comprise two types of layers (e.g., A, B, A, B, A, B . . . ), three types of layers (e.g., A, B, C, A, B, C, A, B, C . . . ), four types of layers (e.g., A, B, C, D, A, B, C, D . . . ), or more types of layers. Non-alternating layers may comprise three or more, four or more, or five or more different types of layers. Laminated, as used herein includes nanolaminated.

"Nanolaminate" or "nanolaminated," within the meaning of this disclosure includes coatings comprising two or more layers in which each of the individual layers has a thickness of less than 10,000 nanometers (i.e., 10 microns). In other words, the term "nanolaminated" in "nanolaminated coatings" in this disclosure refers to the thickness of the layers in the coating, not the overall thickness of the coating made up of the individual layers. In embodiments, "nanolaminated" refers to materials or coatings that comprise, consist essentially of, or consist of, a series of laminated layers less than 1 micron. The processes described herein are particularly suited for providing nanolaminated coatings, however, they certainly also can be used to make articles in which the individual layers that are thicker than 10 microns.

"Workpiece" includes any item with a surface onto which a coating is electrodeposited. Workpieces include substrates, which are objects on which a coating is applied, and mandrels, which are substrates from which the coating is removed after formation. Workpieces can be formed of a conductive material (e.g., a metal), formed of a mixture of conductive and non-conductive materials (e.g., a polymer-metal mixture), or coated with a conductive material (e.g., non-conductive material coated with a metal layer through electroless deposition).

A workpiece employed in embodiments of the present disclosure may be any suitable workpiece. In embodiments, a workpiece is made of a polymeric material. In some embodiments, a polymeric material is a plastic material. In other embodiments, a workpiece is made of a metal or an alloy. In some embodiments, the metal is a steel alloy.

The term "wavelength" refers to the thickness of two adjacent layers that are formed in a single deposition cycle in embodiments where the current density is a periodic function.

"Complex waveform" as used herein refers to any arbitrary waveform that can be generated or modified during the electrodeposition process, including waveforms consisting of a fundamental frequency, waveforms with a fundamental frequency having superimposed harmonics, and/or waveforms consisting of a combination of two or more waveforms. The complex waveform can include off periods and periods where current is reversed (e.g., pulse and pulse reverse plating waveforms).

As used herein, "generate" includes the initial creation of a new waveform and/or subsequent modifications or changes to the waveform. The generation of the full waveform can use a nested loop sequence control in which the final electrodeposition waveform is generated by looping the sequenced sub-waveforms for a predetermined cycle count, a predetermined time period, or indefinitely until the electrodeposition process is stopped or changed for some reason. In some embodiments, the custom electrodeposition waveform is generated by modulating a base waveform using characteristics of a second waveform to generate a "second-order" waveform that is then used as the electrodeposition waveform. Characteristics of the second waveform may include one, two, three, or more of amplitude, frequency, offset, slew, overshoot, wavelength, phase, velocity, and derivative of the waveform (to account for sharp or continuous transitions of the waveform). The waveforms that are used to generate the second-order waveform are also referred to herein as "first-order" waveforms. The first-order waveforms can be selected from a plurality of preloaded waveforms and can be standard waveforms such as, for example, sinusoidal waveforms, triangular waveforms, square waves, etc., and/or another custom waveform. Information from one or more of the first-order waveforms (e.g., information related to the amplitude, frequency, offset, slew, wavelength, phase, velocity, derivative of the waveform, etc.) can be used to modify another first-order waveform or an existing electrodeposition waveform to generate an electrodeposition waveform that is output to one or more set of electrodes in the electrochemical processing tanks.

The terms "a," "an," "the," and similar articles or terms used in the context of describing the disclosure (especially in the context of the following claims) are to be construed to cover both the singular and the plural (i.e., "one or more"), unless otherwise indicated herein or clearly contradicted by context. Ranges of values recited herein are intended to serve as a shorthand method of referring individually to each separate value falling within the range. In the present description, any concentration range, percentage range, ratio range, or integer range is to be understood to include the value of any integer within the recited range and, when appropriate, fractions thereof (such as one tenth and one hundredth of an integer), unless otherwise indicated. Also, any number range recited herein relating to any physical feature, such as size or thickness, are to be understood to include any integer within the recited range, unless otherwise indicated. Unless otherwise indicated herein, each individual value is incorporated into the specification as if it were individually recited herein.

The use of the alternative (e.g., "or") should be understood to mean one, both, or any combination thereof of the alternatives. The various embodiments described above can be combined to provide further embodiments. Groupings of alternative elements or embodiments of the disclosure described herein should not be construed as limitations. Each member of a group may be referred to and claimed individually, or in any combination with other members of the group or other elements found herein. The phrase "or," as used herein in the specification and in the claims, should be understood to mean "either or both" of the elements so conjoined, i.e., elements that are conjunctively present in some cases and disjunctively present in other cases. Multiple elements listed with "or" should be construed in the same fashion, i.e., "one or more" of the elements so conjoined. Other elements may optionally be present other than the elements specifically identified by the "or" clause, whether related or unrelated to those elements specifically identified. Thus, as an example, a reference to "A or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as an example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as an example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the context of this disclosure, the words "process" and "method" are synonymous. It should also be understood that, unless clearly indicated to the contrary, processes described herein and claimed below can include steps in addition to the steps recited, and the order of the steps or acts of the process is not necessarily limited to the order in which the steps or acts of the process are recited.

Each embodiment disclosed herein can comprise, consist essentially of, or consist of a particular stated element, step, ingredient, or component. The term "comprise" or "comprises" means "includes, but is not limited to," and allows for the inclusion of unspecified elements, steps, ingredients, or components, even in major amounts. The phrase "consisting of" excludes any element, step, ingredient, or component that is not specified. The phrase "consisting essentially of" limits the scope of the embodiment to the specified elements, steps, ingredients, or components, and to those that do not materially affect the basic and novel characteristics of the claimed disclosure.

In embodiments, a system for depositing a layered nanolaminate alloy includes one or more electrochemical processing tanks, with each electrochemical processing tank having one or more sets of electrodes for use in depositing multilayer nanolaminate coatings on one or more workpieces. Such a system may also include one or more electrodeposition power supplies, with each power supply respectively connected to an electrode set of the one or more sets of electrodes. In embodiments, each power supply has an input connection configured to receive a complex waveform signal corresponding to a desired electrodeposition waveform to be output from the power supply, and each power supply is configured to amplify the received complex waveform signal to generate the desired electrodeposition waveform. Each electrodeposition power supply may transmit the desired electrodeposition waveform to the corresponding electrode set in the one or more sets of electrodes. In some embodiments, an electrodeposition power supply independently provides electrodeposition waveforms to more than one corresponding electrode set. Such electrodeposition waveforms provided by the corresponding power supply drives the deposition of the nanolaminate coatings on the corresponding workpiece. A given electrodeposition power supply has a maximum switching speed, which measures how fast the power supply changes from a first amplitude level to a second amplitude level.

In embodiments, the system also includes a processor-based controller having a waveform synthesizer circuit configured to generate each complex waveform signal to be transmitted to the input of the respective electrodeposition power supply. In some embodiments, the processor-based controller also includes a synthesizer control circuit that is configured to control the waveform synthesizer circuit. Based at least in part on a recipe having information related to the depositing of the multilayer nanolaminate coatings, the synthesizer control circuit controls the generating of the respective complex waveform signal by modulating in real-time at least one of a waveform shape, a frequency, an amplitude, an offset, a slew, a wavelength, a phase, a velocity, and a derivative of the complex waveform signal. As such, in some embodiments, the processor-based controller provides for, and modulates in real-time, off periods, forward pulse times, reverse pulse times, or a combination thereof. In further embodiments, the processor-based controller further includes one or more controller output circuits respectively connected to the input of each electrodeposition power supply, with each controller output circuit configured to transmit the corresponding complex waveform signal to the input of each electrodeposition power supply. In embodiments, the synthesizer control circuit includes a field-programmable gate array (FPGA). In some embodiments, the modulating in real-time of at least one of a waveform shape, a frequency, an amplitude, an offset, a slew, a wavelength, a phase, a velocity, and a derivative of the complex waveform signal includes modulating one or more first characteristics of a base first-order waveform using one or more second characteristics of at least one other first-order waveform based on a functional relationship between the first and second characteristics to generate the respective complex waveform signal. In some embodiments, the modulating in real-time of at least one of a waveform shape, a frequency, an amplitude, an offset, a slew, a wavelength, a phase, a velocity, and a derivative of the complex waveform signal includes serially combining sub-waveform sequences to generate the respective complex waveform signal.

A processor-based controller has a maximum sample rate (also called the clock rate or clock frequency), which is the rate at which the power output is sampled. Generally, to produce accurate waveforms a sample rate is many times greater than the signal's highest frequency. A sample rate defines the step width of the generated signal as well as the maximum achievable signal frequency. In embodiments, sampling rates are range from DC to 12 GHz. In other embodiments, sampling rates range from DC to 350 KHz. In embodiments, a processor-based controller modulates a sample rate. In some embodiments, a processor-based controller has a sample rate that is higher than the maximum sample rate for a given power supply. In such embodiments, a processor-based controller may modulate the sample speed to meet the maximum sample rate of the power supply, for example, in order to conserve resources.

In further embodiments, a processor-based controller controls and/or modulates a switching speed of an electrodeposition power supply. The switching speed may range from 1 picosecond to 500 milliseconds. In embodiments, a switching speed is less than about 5 milliseconds. In further embodiments, a switching speed is about 5 milliseconds.

Embodiments of the systems discussed herein demonstrate improved stability over extended operational periods when compared to existing systems by, in part, incorporating a controller having a waveform synthesizer circuit and a synthesizer control circuit to dynamically change the electrodeposition waveform based on a process step and/or process feedback, such as temperature of the electrolyte, total thickness of a deposited coating, thickness of a deposited layer or deposited layers, coating resistivity, current and/or voltage readings between individual electrodes, and/or other process and/or system feedback. In some embodiments, the synthesizer control circuit is a FPGA that provides parallel processing capability. Additionally, the controller enables the generation of waveforms having any desired waveform profiles (e.g., a complex waveform having any desired waveform shape, frequency, amplitude, offset, slew, wavelength, phase, velocity, and derivative, and/or other waveform parameter(s)), to produce a desired coating composition and/or microstructure. The desired waveform profile can apply to the voltage and/or to the current profile of the waveform.

The ability to generate complex waveforms provides significantly more flexibility in the electrodeposition process than traditional power supplies. The additional flexibility may be necessary in order to produce nanolaminated coatings that are within a desired range of deposited species, microstructures, and/or thicknesses. Thus, power supply systems that are capable of producing a variety of waveforms having any desired waveform profile represent an improvement over traditional power supply systems for controlling the production of nanolaminated coatings. In contrast, traditional power supply systems may be preloaded and/or have a limited number of waveform profile patterns (e.g., only square waves).

In embodiments of the present disclosure, the electrodeposition power supply provides electrodeposition waveforms, including periodic waveforms and non-periodic waveforms having any desired parameter. In some embodiments, the electrodeposition waveform is selected from a plurality of waveforms that have been preloaded into, for example, a controller or another device in the electrodeposition system.

Alternatively, or in addition to preloaded waveforms, the electrodeposition waveform can be custom-built using waveform software that can create entirely new waveforms and/or modify existing waveforms (e.g., existing waveforms that have been preloaded into the system). In some embodiments, the custom electrodeposition waveform is generated from sub-waveforms, which can also be preloaded into the system, that are then sequenced together to generate the full electrodeposition waveform.

Another embodiment of the present disclosure is directed to a controller for an electrodeposition process that includes a waveform synthesizer circuit configured to generate a complex waveform signal corresponding to a desired electrodeposition waveform to be output from an electrodeposition power supply. In embodiments, the controller also includes a synthesizer control circuit configured to control the waveform synthesizer circuit. Based at least in part on a recipe having information related to the electrodeposition process, the synthesizer control circuit controls the generating of the complex waveform signal by modulating in real-time at least one of a waveform shape, a frequency, an amplitude, an offset, a slew, a wavelength, a phase, a velocity, and a derivative of the complex waveform signal. In some embodiments, the controller further includes a controller output circuit configured to transmit the complex waveform signal to an input of the electrodeposition power supply. In embodiments, the synthesizer control circuit includes a FPGA. In some embodiments, the modulating in real-time of at least one of a waveform shape, a frequency, an amplitude, an offset, a slew, a wavelength, a phase, a velocity, and a derivative of the complex waveform signal includes modulating one or more first characteristics of a base first-order waveform using one or more second characteristics of at least one other first-order waveform based on a functional relationship between the first and second characteristics to generate the respective complex waveform signal. In some embodiments, the modulating in real-time of at least one of a waveform shape, a frequency, an amplitude, an offset, a slew, a wavelength, a phase, a velocity, and a derivative of the complex waveform signal includes serially combining sub-waveform sequences to generate the respective complex waveform signal.

Another embodiment of the present disclosure is directed to a method for electrodepositing a coating on a workpiece. In embodiments, the method includes selecting a standardized recipe corresponding to a desired electrodeposition process and adjusting the standardized recipe based on information related to at least one of the workpiece geometry, the workpiece surface area, and an electrodeposition power supply used for the electrodepositing of the coating on the workpiece. In some embodiments, the method also includes generating a complex waveform signal corresponding to a desired electrodeposition waveform based on the adjusted recipe and providing the complex waveform to the electrodeposition power supply. The method may further include generating an electrodeposition waveform in the power supply based on the complex waveform signal and outputting the electrodeposition waveform from the power supply to an electrode set corresponding to the workpiece. In some embodiments, the method includes depositing coatings on the workpiece based on the electrodeposition waveform. The method further involves modulating in real-time at least one of a waveform shape, a frequency, an amplitude, an offset, a slew, a wavelength, a phase, a velocity, and a derivative of the complex waveform signal based at least in part on a recipe having information related to the depositing of the coatings. In any of the described embodiments, the workpiece may be a substrate.

FIG. 1 illustrates an embodiment of an electrodeposition operating environment 100 depicting the control of one or more electrochemical processing tanks 114, 116, 118 via one or more respective controllers 106, 108, 110. The system is operative to deposit a coating, e.g., nanolayered, nanolaminate coating, on workpieces 120, 122, 124. The workpieces 120, 122, 124 in the respective tanks 114, 116, 118 may be a metal (e.g., iron, steel, etc.), metal alloy, or polymeric material (e.g., thermoplastic, thermoset, and/or composite thereof, etc.). The workpieces 120, 122, 124 are connected to electrodes 140a, 142a, 144a, respectively. In embodiments, pumps 132, 134, 136 pump the electrolytic solution to the respective electrochemical processing tanks 114, 116, 118 prior to the electrodeposition process. In some embodiments, pumps 132, 134, 136 are used to add electrolytic solution during the electrodeposition process, if needed. Control valves 156, 158, 160 are respectively connected to processing tanks 114, 116, 118 to remove the electrolytic solution from the respective tanks. Agitators 170, 172, 174 mix the electrolyte solution in the respective tanks 114, 116, 118.

In embodiments, agitators 170, 172, 174, pumps 132, 134, 136 and control valves 156, 158, 160 are respectively controlled by tank automation controllers 150, 152, 154. The tank automation controllers 150, 152, 154 control at least one of an electrolyte level, an electrolyte concentration, an electrolyte temperature, and a flow rate in each of the electrochemical processing tanks 114, 116, 118, respectively. In other embodiments, a single tank automation controller controls at least one of an electrolyte level, an electrolyte concentration, an electrolyte temperature, and a flow rate in each of the electrochemical processing tanks independently. The tank automation controllers 150, 152, 154 can operate autonomously or can operate based on commands received from the respective controllers 106, 108, 110. In embodiments, the controllers 106, 108, 110 communicate with the respective tank automation controllers 150, 152, 154 using a direct communication connection (either wired or wireless) and/or are connected to a common network 180. The common network may be any suitable network, such as an Ethernet network, a Modbus network, a CAN bus network, or some other appropriate communications network.

Each of the electrochemical processing tanks 114, 116, 118 can have sensor assemblies 162, 164, 166 that measure or sense process parameters such as temperature, level, electrolyte concentration, coating thickness, coating resistivity, voltage or current between the electrodes, and/or some other process parameter. In embodiments, the output from the sensor assemblies 162, 164, 166 is sent directly to the controllers 106, 108, 110. In other embodiments, the output from the sensor assemblies 162, 164, 166 is sent to the controllers 106, 108, 110 via the respective tank automation controllers 150, 152, 154, which may also use the sensor signals for controlling, e.g., the temperature, level, electrolyte concentration, etc., in the respective processing tanks 114, 116, 118. In each of the controllers 106, 108, 110, the sensor data can then be used to appropriately control, modify, adjust, etc. the electrodeposition process, including modifying the process sequence steps and/or modifying the electrodeposition waveform, if necessary.

As seen in FIG. 1, in embodiments, each of the controllers 106, 108, 110 are connected to a network 104 and can communicate with a central control station 102 via the network 104. The network 104 can be wireless and/or wired and can be a WAN, LAN, cloud network, and/or the Internet. In embodiments, the controllers 106, 108, 110 include a webserver and the central control station 102 communicates with the controllers 106, 108, 110 using a web browser. By using a browser interface, the central control station 102 does not have to include specialized software for communicating with the controllers 106, 108, 110 and can be any standard computer, smart phone, mobile device, or any other device that has a web browser. Any required process monitoring and/or process configuration software can be incorporated into one or all of the controllers 106, 108, 110. In some embodiments, the central control station 102 is a specialized computer that includes software for monitoring and/or configuring the electrodeposition process of the electrochemical processing tanks 114, 116, 118. In some embodiments, the central control station 102 is disposed locally, i.e., in the same location as the controllers 106, 108, 110. In some embodiments, the central control station 102 is located remotely (e.g., in a central control room, another facility, or in another geographic location). In some embodiments, a central control station is not used, and the electrodeposition process is controlled using one or all of the controllers 106, 108, 110.

In operation, the control station 102 transmits commands to one or more of the controllers 106, 108, 110 to control the electrodeposition process. The commands can be in the form of a "recipe" for the deposition of a coating layer (e.g., a nanolayered metal or metal alloy coating) on a workpiece. In embodiments, the recipe is in a standardized format for features common to a type of electrodeposition process so that the same recipe can be used, (i.e., a "standardized recipe"). For example, in many cases, the sequence of steps for coating a workpiece, the criteria for adding back solution during the process, and/or the output waveform of the power supply used in the electrodeposition process may be the same despite the scale of the electrodeposition process. However, differences in the workpiece size, workpiece geometry, power supply amperage rating, chemical addback quality, etc. from that used for configuring the standardized recipe should be taken into account when the actual process deviates from that of the standardized recipe, which is typically the case. To this end, once the operator selects the desired standardized recipe, the operator inputs details of the actual process (e.g., details of the power supplies, the workpiece, etc.). These operator inputs are then used by the respective controllers 106, 108, 110 to adjust for the differences between the standardized recipe and the actual process. In embodiments, the operator inputs are simplified by having the operator select from predetermined selection lists. For example, the operator may be presented with a list of workpiece sizes and/or geometries and a list of power supply model numbers having various amperages that are compatible with the selected recipe, to name a few. The controllers 106, 108, 110 are configured to use the operator inputted information to confirm and/or adjust, if needed, the set points for the electrodeposition process (e.g., power supply amperage, chemical concentration, pump flow, etc.) and/or the criteria for satisfying each recipe step of the recipe (e.g., a predetermined time duration, a predetermined amp-hour accumulation, process feedback such as solution concentration satisfying a predetermined value, etc.). Alternatively, or in addition to predetermined lists, the operator can also have the option of inputting information directly.

In embodiments, the recipe is in a generic (e.g., non-proprietary) format that is received and used by controllers of different models, manufacturers, etc. In some embodiments, the recipe is in human-readable form to identify the coating that will be produced by the recipe. In embodiments, the recipe includes information on the sequencing steps for controlling each of the coating layers of the electrodeposition process. For example, the sequencing steps can include instructions for controlling the various equipment (e.g., pumps 132, 134, 136, agitators 170, 172, 174, control valves 156, 158, 160, etc.) used in the electrodeposition process, the time duration for each step, the amp-hour accumulation for each step, and/or information for creating and/or criterial for modifying an electrodeposition waveform profile (e.g., a current and/or voltage waveform profile, to be transmitted to one or more sets of electrodes 140a, 140b, 142a, 142b, 144a, 144b in electrochemical processing tanks 114, 116, 118). The recipe can also include instructions for the current density used in the various steps of the electrodeposition process (e.g., the current density for each of the coating layers in a multilayer nanolaminate process).

Based on the geometric shape and size of the respective workpieces 120, 122, 124, in some embodiments, the controllers 106, 108, 110 use the current density information to appropriately control the output power of the respective power supplies 126, 128, 130 during the various steps of the electrodeposition process. The geometric shape and size of the workpiece 120, 122, 124 can also be transmitted via the recipe and/or can be manually input in the controller 106, 108, 110. Operational instructions, such as, for example, setting the flow rate, temperature, and/or the electrolyte concentration in the electrochemical processing tanks 114, 116, 118, can be directly executed by the controllers 106, 108, 110 and/or be transmitted to the respective tank automation controllers 150, 152, 154 for further processing and execution. The recipe can also include instructions for responding to a change in system conditions such as, for example, instructions for modifying the electrodeposition waveform and/or the sequence steps based on, for example, a predetermined time period or duration, a predetermined amp-hour accumulation, and/or feedback from sensor assemblies 162, 164, 166 in the electrochemical processing tanks 114, 116, 118.

In embodiments, one or more of the controllers 106, 108, 110 receive the instructions from the control station 102 (e.g., via a web browser interface), and then respectively transmit, via the communication network 104, appropriate commands to at least one other controller. Thus, each controller 106, 108, 110 on the network 104 can act as a node of a mesh network. The mesh network of controllers improves the stability of the system by reducing the system's reliance on a single external control station, such as control station 102, for providing a master control of the controllers in the system. For example, once the instructions are sent by the control station 102 to one or more of the controllers 106, 108, 110, all the other controllers can cooperate to ensure that the instruction data is properly distributed. The controllers 106, 108, 110 can act autonomously when controlling their respective tanks 114, 116, 118 based on the respective recipes. However, when needed, the controllers 106, 108, 110 can also share data (e.g., the instructions from control station 102, process data, etc.) via the network 104 to improve system stability. In some embodiments, rather than a separate control station 102, one or more of the controllers 106, 108, 110 store the recipes for the entire electrodeposition process and act as the master control station. In some embodiments, at least one of the controllers 106, 108, 110 includes a database for storing data related to the deposition processes. For example, each of the controllers 106, 108, 110 can include a database to store the instruction data received from the control station 102.

In still further embodiments, the one or more controllers 106, 108, 110 are deployed in a single tank and cooperate to ensure that the instruction data is properly distributed to individual portions of the single tank. A single tank system may be deployed for depositing coatings on large structures (e.g., oil and natural gas production tubulars having lengths ranging between approximately 15 and 45 feet). In the foregoing embodiments, controllers 106, 108, 110 may individually control portions of a bus bar in a large electrodeposition tank having a single power supply or multiple supplies. In some embodiments, a single controller controls a plurality of power supplies (e.g., distributed along the length of a bus bar).

Embodiments of the controller 106, 108, 110 will now be described. For clarity, the embodiments will be described with respect to the tank system associated with controller 106. However, those skilled in the art will understand that the description will also be applicable to the tank systems associated with controllers 108 and 110. The controller 106 can include any type of programmable processor-based computer. In embodiments, the controller 106 is a standalone controller in that the controller is not connected to other computers. However, it is contemplated that the controller 106 will be part of a network with other computers and processor-based controllers that are interconnected (e.g., via network 104, as seen in FIG. 1).

Figure 2A:
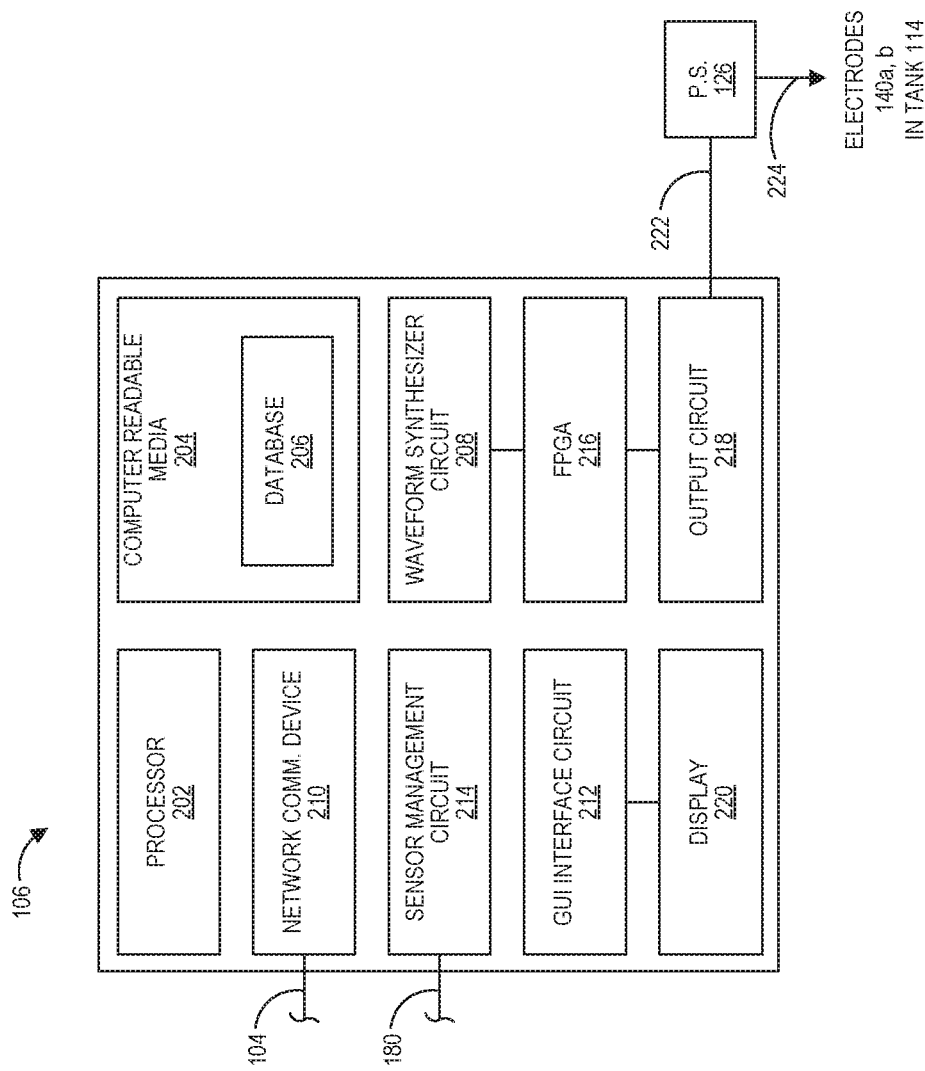
FIG. 2A illustrates an embodiment of a controller that can be used in the system of FIG. 1.

In some embodiments, the controller 106 is a single-board reconfigurable I/O device (sbRIO). For example, as seen in FIG. 2A, the controller 106 is a sbRIO that includes a processor 202 to execute the steps for controlling the electrodeposition process. The controller 106 also includes computer-readable media 204, which can be, for example, a disk drive, optical drive, solid-state drive, flash drive, or another type of drive to store, for example, the operating system and/or application software such as, for example, waveform generation software to be executed by the processor 202 to generate the electrodeposition waveform signal 222 and/or process software to perform other operational functions with respect to the electrodeposition process. In some embodiments, the processor 202 generates the electrodeposition waveform signal 222 in real-time. The controller 106 can be used to control and/or monitor the electrodeposition process via a GUI circuit 212. The GUI circuit 212 can include a display 220 (e.g., an LCD, an LED display or another type of display). In some embodiments, the display 220 is integral to the controller 106 and/or a remote GUI (graphical user interface) is attached to the controller 106 via appropriate hardware. A user can use the display 220 and/or a remote GUI to monitor and/or control the deposition process of tank 114 and/or another tank via the network 104.

The controller 106 includes a network communication device 210 that can be connected to an external network 104 (see FIG. 1). The external network can be a LAN, WAN, cloud, Internet, or some other network, and can be wired and/or wireless. In some embodiments, a separate communication circuit is included for the controller 106 to communicate with tank automation controller 150 via, for example, network 180. Depending on the network and/or the portion of the network, the protocol used in network 104 and/or the network 180 can be any standard protocol, such as, for example, Ethernet, Modbus, CAN bus, TCP/IP, or any other appropriate protocol. Of course, the protocol between the network 104 and network 180 need not be the same and can be different. In some embodiments, the tank automation controller 150 communicates with other tank automation controllers 152, 154 via the network 180.

The controller 106 can include a database 206 for storing the recipe and/or other instructions. The database 206 can be stored in computer-readable media 204 and/or the database 206 can be stored on a separate device or devices. Along with the database 206, the computer-readable media 204 can include the operating system and/or application software, such as, for example, waveform generation software and/or process software, for controlling the electrodeposition process. In some embodiments, the controller 106 includes a waveform synthesizer circuit 208 that is operatively connected to an a synthesizer control circuit configured to control the waveform synthesizer circuit 208 to generate the electrodeposition waveform signal 222 based at least in part on the recipe. In embodiments, the synthesizer control circuit is an FPGA circuit 216. In embodiments, the FPGA circuit 216 has a plurality of logic blocks or logic cells that are configurable. The logic blocks on the FPGA circuit 216 can be configured into functional control blocks, such as, for example, sequence controllers, PID controllers, comparators, multipliers, upper and/or lower limit blocks for process parameters, summers, multiplexers, amplifiers, and/or any other type of functional logic circuit. The functional control blocks from one or more independent control circuits, such as, for example, generation of the electrodeposition waveform by controlling the waveform synthesizer circuit 208 and/or circuits to control the sequence steps of the electrodeposition process. For brevity, embodiments of the controller 106 will be described using the FPGA circuit 216. However, the synthesizer control circuit and/or the circuits to control the sequence steps are not limited to an FPGA, and other type of programmable logic circuits can be used.

The FPGA circuit 216 controls the generating of the waveform signal 222 by modulating in real-time a waveform shape, a frequency, an amplitude, an offset, a slew, a wavelength, a phase, a velocity, a derivative, and/or another waveform parameter of the waveform signal 222. Specifically, the FPGA circuit 216 controls the waveform synthesizer circuit 208 to generate a digital waveform signal based on the instructions in the recipe. That is, based on the recipe that is stored in database 206 and/or received from the control station 102 or another controller, the FPGA circuit 216 can control the waveform synthesizer 208 to generate an electrodeposition waveform signal 222 having any desired waveform profile (e.g., any desired amplitude, any desired frequency (including steady-state, e.g., zero frequency and up to the capability of the electrodeposition power supply), any desired waveform shape (e.g., a sinusoidal shape, a triangular shape (e.g., sawtooth), a square wave and/or another type of waveform shape), any desired offset, any desired slew, any desired wavelength, any desired phase, any desired velocity, and/or any desired derivative). Of course, those skilled in the art understand that "any desired" amplitude, frequency, offset, shape, etc. means up to the limits and rating of the power supplies and the other components used in the electrodeposition system.

In addition, the desired waveform profile can be based at least in part on the desired current density generated throughout the workpiece, which can also be transmitted as part of the recipe. The controller 106 can use the information related to the current density and the information related to the geometric shape of workpiece 120 to generate the desired electrodeposition waveform signal 222. For example, at least one of the amplitude, frequency, offset, slew, wavelength, phase, velocity, and derivative of the electrodeposition waveform signal 222 can depend on the desired current density and the geometric shape and size of the workpiece 120. The digital waveform signal may then be converted to an analog signal (e.g., electrodeposition waveform signal 222) by a digital-to-analog circuit, which can be incorporated in the waveform synthesizer circuit 208 and/or the FPGA circuit 216. In some embodiments, the waveform signal 222 is then output from the controller 106 via a controller output circuit 218 to the input of the power supply 126. In embodiments, the electrodeposition signal 222 output from controller output circuit 218 is an analog signal that is transmitted to a plurality of different types of power supplies. In some embodiments, the digital waveform signal from the waveform synthesizer circuit 208 is not converted to an analog signal, and the digital waveform signal is sent directly to the power supply 126.

In some embodiments, the controller 106 has more than one output circuit 218. For example, the controller 106 can have up to eight output circuits. Of course, in other embodiments, the controller 106 has more than eight output circuits. The power supply 126 is configured to track or follow the waveform signal 222 and output the electrodeposition waveform 224 to, for example, electrodes 140*a*, 140*b*. That is, the power supply 126 amplifies the waveform signal 222 to generate the electrodeposition waveform 224.

In some embodiments, the controller 106 includes a means for receiving the feedback from the electrodeposition process tank 114. For example, the controller 106 can include a sensor management circuit 214 that receives process feedback signals from one or more sensors in sensor assembly 162 disposed in the electrochemical processing tank 114. The feedback signals can be sent to sensor management circuit 214 from sensor assembly 162 either directly or via tank automation controller 150. Sensor management circuit 214 can be configured to receive digital and/or analog signals. However, in some embodiments, the sensor management circuit receives the feedback via network communications. For example, sensor assembly 162 can be directed connected to tank automation controller 150, which can then transmit the feedback signals via network 180. The sensor management circuit 214 can include a network communications circuit for communication with network 180, which can also be connected to sensor assemblies 164, 166 via the respective tank automation controllers 152, 154, and the feedback signals from sensor assemblies 164, 166 can be used in controlling power supply 126, if desired. In embodiments, the sensor assembly 162 include one or more sensors such as, for example, a temperature sensor, an electrolyte level sensor, a electrolyte concentration sensor, a sensor to determine agitation rate, a sensor to determine coating thickness, and/or a sensor to determine coating resistivity. In embodiments, the sensor assembly 162 also includes a current sensor and/or a voltage sensor for determining current and/or voltage between individual electrodes 140*a*, 140*b* in the tank 114. Alternatively, or in addition to the current/voltage sensors of sensor assembly 162, the power supply 126 can include current and/or voltage sensors that are then fed back to controller 106. Of course, other types of sensors can be used based on the process parameter to be monitored. Based on the feedback signals, the controller 106 can modify the output electrodeposition waveform (e.g., the current and/or voltage waveform) to improve the accuracy of the electrodeposition process for producing the desired coating composition and/or microstructure. For example, based on the feedback signals, the FPGA circuit 216 can dynamically control, in real time, waveform synthesizer circuit 208 to adjust the amplitude, frequency, offset, slew, wavelength, phase, velocity, derivative, and/or another waveform characteristic to precisely control the electrodeposition process.

The information on generating the electrodeposition waveform 224 can be sent via the recipe. For example, in addition to including the instructions for initially generating an electrodeposition waveform, which can be any complex waveform, the recipe can also include instructions for modifying, in real-time, waveform parameters such as the waveform profile, current density, etc., of the electrodeposition waveform 224. For example, any one of the waveform profile characteristics such as, for example, the waveform shape, frequency, amplitude, offset, slew, wavelength, phase, velocity, derivative, or some other waveform profile characteristic, can be dynamically changed or modified. The instructions to change one or more of the waveform parameters, such as waveform profile, current density, etc., can be based on a predetermined time duration, based on a process step being performed or to be performed, based on a feedback from process sensors, and/or based on some other basis for modifying a waveform parameter. For example, the recipe can include instructions to use a sinusoidal waveform for a predetermined time duration (e.g., the first half of a deposition process, and then to use a square wave for the second half of the deposition process). In addition, the electrodeposition process can include different waveform profiles for some or each of the coating layers being deposited. That is, the recipe can specify the type of waveform profile and/or current density to be used for each deposition layer, and at least one of the layers can be deposited using a waveform that is different than those used to deposit the other layers. In embodiments, based on the recipe, the FPGA circuit 216 appropriately controls the waveform synthesizer circuit 208 to produce the desired waveform for each layer being deposited.

Further, in some embodiments, the FPGA circuit 216 is configured such that the electrodeposition waveform signal 222 is modified based on the process feedback signals from, for example, sensor assembly 162. For example, based on data from sensor assembly 162 (which can relate to, e.g., process temperatures, electrolyte concentration, electrolyte level, coating thicknesses, coating resistivity, current and/or voltage readings between individual electrodes, and/or some other process/system feedback), the FPGA circuit 216 can control the waveform synthesizer circuit 208 to appropriately adjust the current density, waveform profile (e.g., frequency, amplitude, offset, slew, wavelength, phase, velocity, derivative, etc.), and/or any other waveform parameter of the electrodeposition waveform signal 222.

After the controller 106 generates the waveform signal 222, the waveform signal 222 is then output from controller output circuit 218 of the controller 106 and sent to, for example an input of an electrodeposition power supply 126. The electrodeposition power supply 126 then generates the output electrodeposition waveform 224 based on the received waveform signal 222. In embodiments, the electrodeposition power supply 126 acts as an amplifier that precisely tracks or follows the input waveform 222 from the controller 106 and outputs an appropriate electrodeposition waveform 224, which is transmitted to the electrodes 140*a*, 140*b* in tank 114. The waveform profile (e.g., frequency, amplitude, shape, etc.) of the output electrodeposition waveform 224 corresponds to the waveform profile of the waveform signal 222 and provides the appropriate current density.

In some embodiments, to ensure that the output electrodeposition waveform 224 from the electrodeposition power supply matches the waveform signal 222 from the controller, the controller takes into account the capabilities of the electrodeposition power supply 126. For example, the control 106 can take into account one or more waveform parameters, such as, for example, slew rate, percentage overshoot, and/or another waveform parameter that can be dependent on the characteristic of the electrodeposition power supply 126 when generating the waveform signal 222. That is, in some embodiments, when generating the waveform using the waveform synthesizer circuit 208, the waveform instructions from the recipe are implemented using known characteristics of the electrodeposition power supply 126. In some embodiments, the characteristics are common to a group of power supplies. For example, the slew-rate, percentage overshoot, or some other characteristic can be common to all power supplies of a specific type, such as, for example, the same model, the same manufacturer, the same rating or rating range, and/or some other distinguishing feature for a class of power supplies. Knowing the characteristics of the individual electrodeposition power supply and/or a class of electrodeposition power supplies provides advantages not found in prior art controllers because embodiments of controllers of the present disclosure can use the power supply characteristics information to precisely control the output electrodeposition waveform of the power supply.

Information related to the characteristics of the individual power supplies and/or a group of power supplies can be stored in power supply driver files corresponding to the individual power supplies and/or a group of power supplies. The power supply driver files can be physically stored in, for example, the database 206 and/or some other location. The power supply driver file functions similar to a printer driver file that provides information on converting the data to be printed to correspond to the type of printer being used. In this case, the power supply driver file includes information on the type of power supply being used or, more particularly, the characteristics of the power supply being used. For example, the power supply driver file can include information as to whether the power supply 126 can be a forward and/or a reverse power supply and/or can include information as to the output current rating of the power supply 126. The characteristic information can be associated to individual power supplies (e.g., via the serial numbers of the power supplies) and/or associated to a class that the power supply belong to (e.g., manufacturer, model, output power range, any combination thereof, etc.).

The waveform generation software uses the information in the power supply driver file when generating the electrodeposition waveform based on the recipe. For example, the FPGA circuit 216 can modify how it controls the waveform synthesizer circuit 208 based on the information in the power supply diver file. The power supply driver file ensures that the electrodeposition waveform signal 222 matches as close as possible the waveform requested in the recipe but also ensures the electrodeposition waveform signal 222 does not go beyond the capabilities of the electrodeposition power supply 126. For example, the driver file will ensure that parameters such as the slew rate rating and percent overshoot of the electrodeposition power supply 126 are considered when generating the electrodeposition waveform signal 222. The slew rate can identify to the waveform generation software the maximum frequency and amplitude that the electrodeposition power supply 126 can be driven at and still be within acceptable limits. The percent overshoot identifies the response of the electrodeposition power supply 126 to a step change in the input signal. By considering these and other waveform parameters, the information in the power supply driver file ensures there is minimal distortion of the electrodeposition waveform 224 during the deposition process (e.g., little or no overshoot or undershoot of the electrodeposition waveform 224). In addition, the power supply driver file allows the waveform instructions in the recipe to be standardized for a range of power supplies. For example, a single controller 106 can control a range of power supplies that can provide electrodeposition currents from, for example, about 200 A to about 15,000 kA. That is, by using the power supply driver file, the waveform instructions in the recipe can be generic in that the instructions are not tailored to a specific power supply or to a class of power supplies. Further, a power supply driver file may include information regarding a maximum switching speed and/or a maximum sample rate of the electrodeposition power supply. In such embodiments, a controller that has a higher sample rate than the maximum sample rate of the electrodeposition power supply may reduce the sample rate used in order to conserve resources.

The same standardized or generic instructions can be used for different types of power supplies, for example, power supplies of different manufactures, different models, different power ratings, etc. For example, the recipe can merely provide standardized or generic instructions to produce a square wave and the FPGA circuit 216 will control the waveform synthesizer circuit 208 based on the driver file to output a waveform signal 222 with the proper characteristics, such as, for example, the frequency, amplitude, slew rate, etc., for the electrodeposition power supply 126 to prevent undesired distortion on the output electrodeposition waveform 224, such as, for example, undesired overshoot and/or undershoot in the waveform 224. In embodiments, if the requested waveform in the recipe exceeds the capabilities of the electrodeposition power supply 126 (e.g., the requested frequency, amplitude, etc. is beyond the capabilities of the power supply), the information in the power supply driver file alerts the controller 106 and ultimately the operator that the requested deposition process will not work with the present equipment. In this case, in some embodiments, the FPGA circuit 216 is configured to not perform the requested operation and/or stop the electrodeposition process. In still further embodiments, the controller 106 receives a measure of the output electrodeposition waveform between a set of electrodes and compare the measured output to ensure that the output electrodeposition waveform 224 from the electrodeposition power supply matches the waveform signal 222 from the controller.

Figure 3:
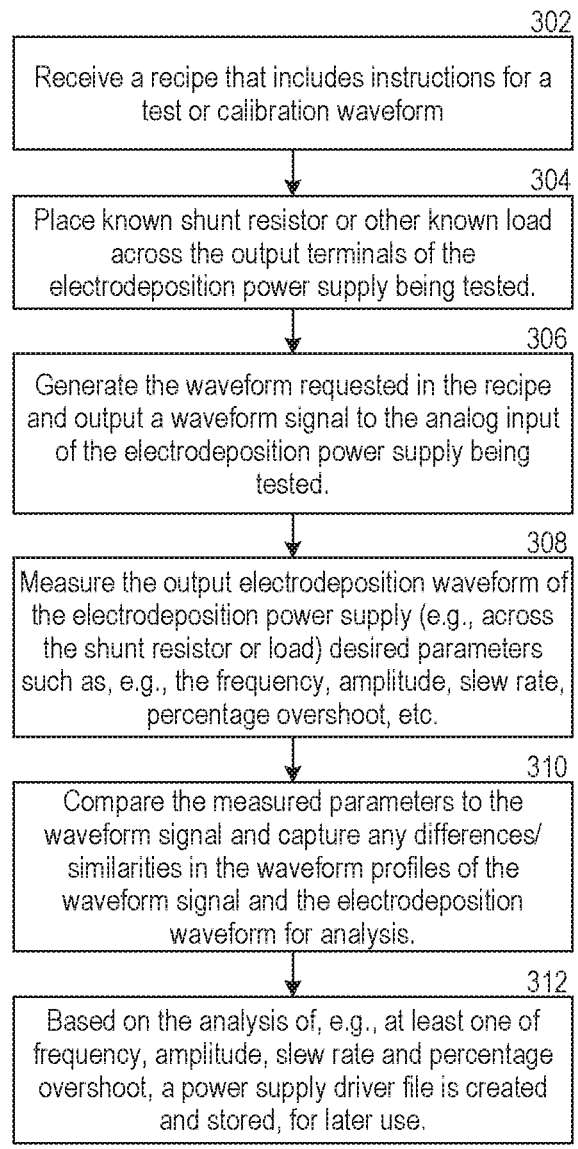
FIG. 3 illustrates a method of calibrating an electrodeposition power supply to create a power supply driver file.

In some embodiments, the controller 106 creates the power supply driver file. For example, the response of the electrodeposition power supply 126 (e.g., slew rate, percent overshoot, etc.) can be measured with respect to a test waveform signal (e.g., a "calibration" waveform signal) that is output by the controller 106. For example, as seen in FIG. 3, in step 302, the controller 106 receives a recipe that includes instructions for a test or calibration waveform. In some embodiments, the test or calibration waveform or waveforms are stored in the controller 106, and the controller 106 reads a stored calibration waveform when performing the calibration procedure. The test or calibration waveform can include instructions for generating a waveform having various subsections that test the capabilities of the electrodeposition power supply. Each subsection can have a different waveform shape (e.g., sinusoidal, triangular, square wave, etc.), a different frequency, a different amplitude, a different offset, a different slew, a different wavelength, a different phase, a different velocity, a different derivative, and/or some other difference between the subsections.

In step 304, a known shunt resistor or other known load is placed across the output terminals of the electrodeposition power supply being tested. In step 306, the controller 106 generates the waveform requested in the recipe and outputs a waveform signal 222 to the input of the electrodeposition power supply 126 being tested. In step 308, desired parameters, such as, for example, the frequency, amplitude, slew rate, percentage overshoot, etc., are measured at the output of the electrodeposition power supply 126, for example, across the shunt resistor or load. In step 310, the measured parameters are compared to the waveform signal 222 output by the controller 106 and any differences/similarities in the waveform profiles of the signal 222 and the electrodeposition waveform 224 are captured for analysis. In step 312, based on the analysis of, for example, at least one of frequency, amplitude, slew rate, and percentage overshoot, a power supply driver file is created and stored in, for example, database 206 or another location for later use by controller 106. As discussed above, the controller 106 can then use the power supply driver file when generating the waveform signal 222 such that the waveform signal 222 matches the characteristics of the power supply 126. The power supply driver file can be associated to the specific power supply being tested, for example, based on the serial number, and/or be associated with a class of power supplies that have a similar structure as the power supply being tested.

The embodiments of the electrodeposition system discussed above can be used in, for example, in barrel, rack, basket, and brush processing systems. However, for the sake of brevity, a generic electrodeposition process method is illustrated in FIGS. 4A to 4C. FIGS. 4A to 4C illustrate a high-level overview of an electrodeposition process 400 using a controller (e.g., an electrodeposition process that can perform a layered nanolaminate alloy coating having two or more periodic nanoscale layers that vary in electrodeposited species and/or electrodeposited structure). For purposes of brevity, the description is provided with respect to controller 106 and related equipment. However, those skilled in the art will understand that the description is also applicable to a series or a number of controllers including controllers 108 and 110. In step 410, the operator starts the electrodeposition either remotely (e.g., at remote computer 102) or locally at the controller 106.

In step 412, the operator selects the standardized recipe to be used in the electrodeposition process. Once selected, the controller 106 can request to receive the recipe from a remote control station 102, another controller, and/or, if stored in the controller, read the recipe that corresponds to the selected electrodeposition process from database 206. As discussed above, the recipe includes instructions for generating an electrodeposition waveform 224 based on, for example, the sequencing step, the nanoscale layer to be deposited, the species to be deposited, the structure to be deposited, and/or feedback from the electrodeposition process. The recipe can also include the current density, voltage, waveform phase, and/or another waveform parameter to be used for the electrodeposition process and/or each step of the electrodeposition process. In addition, the recipe can include instructions for controlling other devices (e.g., pump 132, agitator 170, control valve 156, etc.).

Also, as discussed above, the recipe information is in a standardized format so that a single generic recipe can be used with various workpieces, power supplies, etc. In step 414, the operator inputs process specific configuration information regarding the deposition process. The inputted information can be information related to the geometry and/or size of the workpiece (e.g., surface area) to be electroplated, information related to the electrodeposition power supply (e.g., model no., manufacturer, the amperage rating, slew rate, etc.), and information related to the add back chemicals (e.g., the type and/or quantity of chemicals to add back, amp-hour at which the chemicals are added, the concentrations of the chemicals, etc.). Of course, the operator can also input any other desired information related to the process. In step 416, the controller makes adjustments to the standardized recipe based on the process specific information input by the operator in step 414. For example, based on the inputted workpiece surface geometry and/or area, the controller 106 can make adjustments to, for example, the waveform profile, the time duration and amp-hour accumulation, and/or some other adjustment, as appropriate, for the recipe steps. In step 418, the controller 106 executes the steps of the recipe, which are shown in FIG. 4B.

As shown in FIG. 4B, the controller 106 sequences through the process steps for the deposition process. For each of the process steps, based on the recipe, the controller 106 controls the species and/or the structure of the layer to be deposited by setting and/or controlling the current density, the profile of the electrodeposition waveform, the flow rate, the process temperature, the electrolyte level, the electrolyte concentration, any combination thereof, etc. The number and nature of the process steps in the recipe can vary depending on the type of deposition process. Turning to FIG. 4B, in step 422, the controller 106 reads the next step in the recipe. In step 424a, the controller 106 sets the output waveform 224 of the power supply 126 to electrodes 140a, 140b. For example, based on the geometry of workpiece 120 and/or other information in the current recipe step, the controller 106 generates the electrodeposition waveform signal 222 having, for example, the desired waveform profile and the desired current density using, for example, the waveform algorithms discussed below. As discussed above, the waveform signal 222 can have any desired waveform profile (e.g., based on the recipe, the controller 106 can generate any complex waveform profile by modulating or changing in real-time the waveform shape, the frequency, the amplitude, the offset, the slew, the wavelength, the phase, the velocity, the derivative, and/or some other waveform parameter). In some embodiments, in generating the waveform signal 222, the controller 106 uses the power supply driver file for electrodeposition power supply 126 to ensure the waveform signal 222 matches the characteristics of the electrodeposition power supply 126. As discussed above, the electrodeposition waveform signal 222 is output from the controller 106 to an input of an electrodeposition power supply 126. The electrodeposition power supply 126 then tracks and amplifies the electrodeposition waveform signal 222 and outputs the electrodeposition waveform 224, which corresponds to the electrodeposition waveform signal 222.

During the setting of the output waveform in step 424a, the controller 106 concurrently performs step 424b, which monitors the process steps and/or process feedback from sensor assembly 162 related to, for example, electrolyte temperature, electrolyte level, electrolyte concentration, thickness of the coating layers, coating resistivity, current, and/or voltage readings between individual electrodes and/or some other process/system feedback. During step 424b, the controller 106 executes the steps shown in FIG. 4C. During step 432 of FIG. 4C, the controller 106 receives process feedback signals as discussed above. For example, in step 432, the controller 106 and/or the tank controller 150 can receive feedback such as coating resistivity, electrolyte temperature, or process chemistries such as electrolyte concentration, etc. In addition, in step 434, the accumulated amp-hours for the power supply 126 are received from the power supply 126 or calculated by controller 106. The accumulated amp-hours can be used to control various equipment in the deposition process. For example, the accumulated amp-hours can be used to control pump 132 to add back some of the chemicals used in the electrodeposition process. In addition, the accumulated amp-hours and feedback of the process chemistries can be used to determine coating thickness.

In step 436, based on the instructions in the recipe and/or on the monitored feedback signals and/or the calculations of steps 432 and 434, the controller 106 determines whether the electrodeposition waveform 224 should remain the same, be switched (e.g., to a preloaded waveform), or be modified, or whether an entirely new custom waveform should be created. For example, if the determination is to keep the same waveform, the controller 106 continues to generate the present electrodeposition waveform signal 222. If the determination is to switch waveforms, the controller 106 switches to a different electrodeposition waveform signal (e.g., to a preloaded waveform such as a standard sine wave, square wave, triangular wave, etc.). If the determination is to modify the waveform, the controller 106 modifies the present electrodeposition waveform 222 using, for example, the examples of waveform algorithms discussed below and/or another algorithm, and if the determination is to create a new custom waveform, the controller creates a new electrodeposition waveform 222 using, for example, the waveform algorithms discussed below, and/or another algorithm.

Once step 436 is completed, the controller loops back to step 424b and advances to step 426. In step 426, the controller determines whether the criteria for completing the current process step have been met. For example, the criteria for completing the current process step can be based on the amount of time the system has been in the current step, the accumulated amp-hours, the process chemistries, the calculated coating thickness, and/or some other criteria. If the criteria have not been met, the controller 106 loops back to the step 424b. If the criteria have been met, the controller 106 advances to step 428. In step 428, the controller 106 checks to see if there are additional process steps or not. If so, the controller loops back to step 422 and starts the next step. If there are no additional steps, the controller returns to step 418 of FIG. 4A and advances to step 420 to stop the process. Of course, the controller 106 can be configured such that the process can also be terminated at any time due to, for example, a manual stop command, a feedback signal, an error signal, etc.

As discussed above, waveform algorithms can be used to create the initial electrodeposition waveform signal 222 and/or to subsequently change or modify the electrodeposition waveform signal 222. In some embodiments, to generate the electrodeposition waveform signal 222, the controller 106 includes a loop waveform algorithm that initiates a nested loop-type control sequence to generate a waveform that forms, at least in part, the electrodeposition waveform signal 222. In some embodiments, to generate the electrodeposition waveform signal 222, the controller 106 includes a second-order waveform algorithm that combines the characteristics of two or more base or first-order waveforms to generate a second-order waveform that forms, at least in part, the electrodeposition waveform signal 222. In some embodiments, the controller 106 includes both the loop waveform algorithm and the second-order waveform algorithm to generate a waveform that forms, at least in part, the electrodeposition waveform signal 222.

In the nested loop-type control sequence of the loop waveform algorithm, an output waveform is generated by using, for example, waveform synthesizer circuit 208 to serially combine (or sequence) sub-waveform sequences (e.g., serially combine different waveforms or portions of different waveforms), and then repeat the sequencing steps to produce one full cycle of the electrodeposition waveform signal 222. The full waveform cycle, which includes the nested sub-waveform cycles, can then be repeated or looped as desired (e.g., the nested loop control sequence can be repeated or looped for a predetermined number of cycles, for a predetermined time period, for a given process step or steps, and/or continuously until stopped based on, e.g., a process feedback signal from sensor assembly 162 (e.g., coating thickness, coating resistance, electrolyte concentration, or some other feedback signal) and/or a stop command for the deposition process). In some embodiments, the FPGA circuit 216 is configured to control to waveform synthesizer circuit 208 such that sub-waveforms are generated a desired number of times and in a desired sequence order to generate the full electrodeposition waveform signal 222. For example, if an electrodeposition waveform signal 222 that has three sinewave cycles followed by three triangle-shaped waveform cycles is required, the FPGA circuit 216 can be configured to control waveform synthesizer circuit 208 such that three cycles of a sinewave sub-waveform are generated and then immediately two cycles of a triangle-shaped sub-waveform are generated to create one full cycle of the electrodeposition waveform signal 222. The FPGA circuit 216 then repeats or loops the full waveform generation cycle, which includes the nested sub-waveform generation cycles, as desired. Of course, the type and number of cycles of sub-waveforms and the sequencing order of the sub-waveforms is not limited to the above embodiment, and any desired sub-waveform type, sub-waveform cycle count, and sub-waveform sequence order can be used. In addition, the sub-waveform types, the sub-waveform cycle count, and/or the sub-waveform sequencing order used in the electrodeposition waveform signal 222 can be changed dynamically by the controller 106 based on the process step, a feedback signal from sensor assembly 162, a predetermined time period, a predetermined cycle count, etc. For example, the sinewave/triangle waveform discussed above can be changed to a sinewave/square wave waveform based on a predetermined criteria related to, for example, electrolyte concentration, electrolyte level, electrolyte temperature, coating thickness, coating resistance, the process step, a predetermined time period, number of cycles, any combination thereof, etc.

In addition to the loop waveform algorithm, the controller 106 can also include a second-order waveform algorithm. The second-order waveform algorithm modulates one or more characteristics (e.g., frequency, amplitude, offset, slew, wavelength, phase, velocity, derivative or some other waveform property) of a base or first-order waveform using characteristics (e.g., frequency, amplitude, offset, slew, wavelength, phase, velocity, derivative, and/or some other waveform property) of one or more additional first-order waveforms to generate a desired output waveform (or second-order waveform). The modulation algorithm can include, for example, additive functions, subtractive functions, multiplying functions, and/or some other functional relationship between the one or more characteristics of the base first-order waveform and the characteristics of the one or more additional first-order waveforms to modify the base first-order waveform and generate a second-order waveform.

The modulation of the characteristic(s) of the base first-order waveform can be selective in that not all of the base waveform characteristics are subject to being changed. For example, only the amplitude of the base first-order waveform can be changed while the remaining characteristics, such as, for example, the frequency, offset, etc., are not modified. The functional relationship can be between characteristics that are the same between the waveforms (e.g., amplitude to amplitude, frequency to frequency, offset to offset, etc.). For example, the amplitude $A_1$ of a base first-order waveform can be modified using the information (e.g., magnitude and/or polarity) of an amplitude $A_2$ of another first-order waveform to generate a second-order waveform with an amplitude $A_3$ that can be, for example, $c_1A_1+c_2A_2$, $c_1A_1-c_2A_2$, $c_1A_1*c_2A_2$, $c_1A_1/c_2A_2$ (where $c_1$ and $c_2$ are constants), or some other functional relationship. The frequency, offset, or another waveform characteristic of a base first-order waveform can similarly be modulated using the respective same characteristic of other waveforms. However, the functional relationship can also be between waveform characteristics that are not the same. For example, the amplitude of the base first-order waveform can be modified using the frequency or some characteristic other than the amplitude of another first-order waveform to generate the second-order waveform. The functional relationship can have a one-to-one characteristic correlation in that one characteristic (e.g., amplitude) of the base first-order waveform is modulated by one characteristic (e.g., frequency) of another first-order waveform. However, the functional relationship need not be a one-to-one characteristic relationship. For example, the amplitude of a first-order waveform can be used to modify both the amplitude and frequency of the base first-order waveform to generate the second-order waveform or both the amplitude and frequency of the first-order waveform can be used to modify just the amplitude (or another characteristic) of the base first-order waveform to generate the second-order waveform. That is, one or more waveform characteristics of a base first-order waveform can be modified based on one or more characteristics of another first-order waveform to generate the second-order waveform.

In the above embodiments, the "base" first order-waveform can itself be a combination of two or more first-order waveforms. Accordingly, any combination of waveform characteristics of a first set of one or more first-order waveforms can be used to modify any combination of waveform characteristics of a second set of one or more first-order waveforms in generating a second-order waveform. The resulting second-order waveforms can be periodic or non-periodic and can result from a modulation of the same type of first-order waveforms (e.g., two or more sinusoidal waveforms, two or more square waves, two or more triangular waveforms, etc.) or can result from a modulation of two or more different types of waveforms (e.g., one or more sinusoidal waveforms with one or more square waves or one or more triangular waveforms, etc.). In some embodiments, the current electrodeposition waveform signal 222 is the base first-order waveform that is then modulated by using the characteristics of one or more other first order waveforms to generate a new electrodeposition waveform signal 222.

Figure 5A:
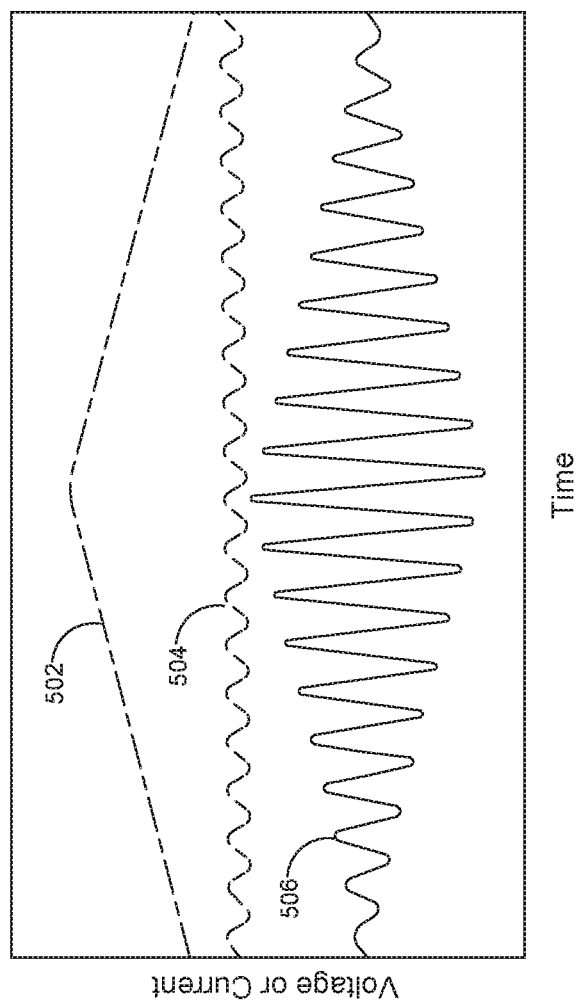
FIG. 5A illustrates generation of a second-order waveform using the characteristics of two first-order waveforms.

The modulation of a first-order waveform based on the characteristics of another first-order waveform to generate a second-order waveform is graphically illustrated in FIG. 5A. FIG. 5A illustrates a second order waveform 506 that was generated using two first-order waveforms 502 and 504. The secondary waveform 506 can be either a voltage waveform or a current waveform. In the embodiment of FIG. 5A, a base first-order waveform 504 is modulated using the characteristics of another first-order waveform 502 to generate the second-order waveform 506. The base first-order waveform signal 504 is a sinusoidal waveform having, for example, a frequency $F_1$ and an amplitude $A_1$. However, the waveform 504 can have any desired waveform profile.

During the deposition process, the controller 106 may determine that the current electrodeposition waveform signal 222 (which can be the waveform 504) should be switched, for example, to preloaded waveform, or be modified or that an entirely new electrodeposition waveform signal 222 should be created because, e.g., the current process step and/or feedback signal(s) from the sensor assembly 162 requires it. If it is determined that the waveform signal 222 should be modified or a new waveform created, the controller 106 can generate a second-order waveform 506 using the characteristics of the base first-order waveform 504 and another first-order waveform 502. The second-order waveform 506 will then be the new electrodeposition waveform signal 222 that can then be transmitted to the electrodeposition power supply 126, as discussed above.

As seen in the embodiment of FIG. 5A, the second-order waveform 506 is generated by modifying the amplitude $A_1$ of the base first-order waveform 504 based on the absolute magnitude of amplitude $A_2$ of first-order waveform 502. In this example, the frequency $F_1$ of the first order waveform 504 remains unchanged. Thus, in this example, after the modification, a sinusoidal second-order waveform 504 is generated having a frequency $F_1$ and an amplitude $(A_1+|A_2|)$. That is, the second order waveform oscillates at a fixed frequency while varying the amplitude over time. Of course, any combination of waveform characteristics of the two or more first-order waveforms can be employed to generate the second-order waveform. For example, in another embodiment, the second order waveform has a frequency that varies and amplitude that remains the same. By dynamically changing the second-order waveform profile (e.g., the combination of frequency, amplitude, waveform shape, offset, slew, wavelength, phase, velocity, derivative, etc.), the current and/or voltage applied during the electrochemical deposition adjusts for and/or drives variations in the composition and/or the microstructure of the nanolaminate composite coating.

The first-order waveforms 502, 504 can be "template waveforms" that are stored in the controller 106 or another location. The controller 106 can have a plurality of first-order template waveforms that are configured to facilitate the generation of second-order waveforms that correspond to specific process steps and/or specific deposition processes. For example, a first set of template waveforms may be beneficial in generating second-order waveforms for the deposition of a first coating layer and a second set of template waveforms may be beneficial in generating second-order waveforms for the deposition of another coating layer in the deposition process. The controller 106 can be configured to use the proper set of template waveforms based on, for example, the type of deposition process, the process step being performed, and/or the feedback signal(s) from sensor assembly 162.

Figure 5B:
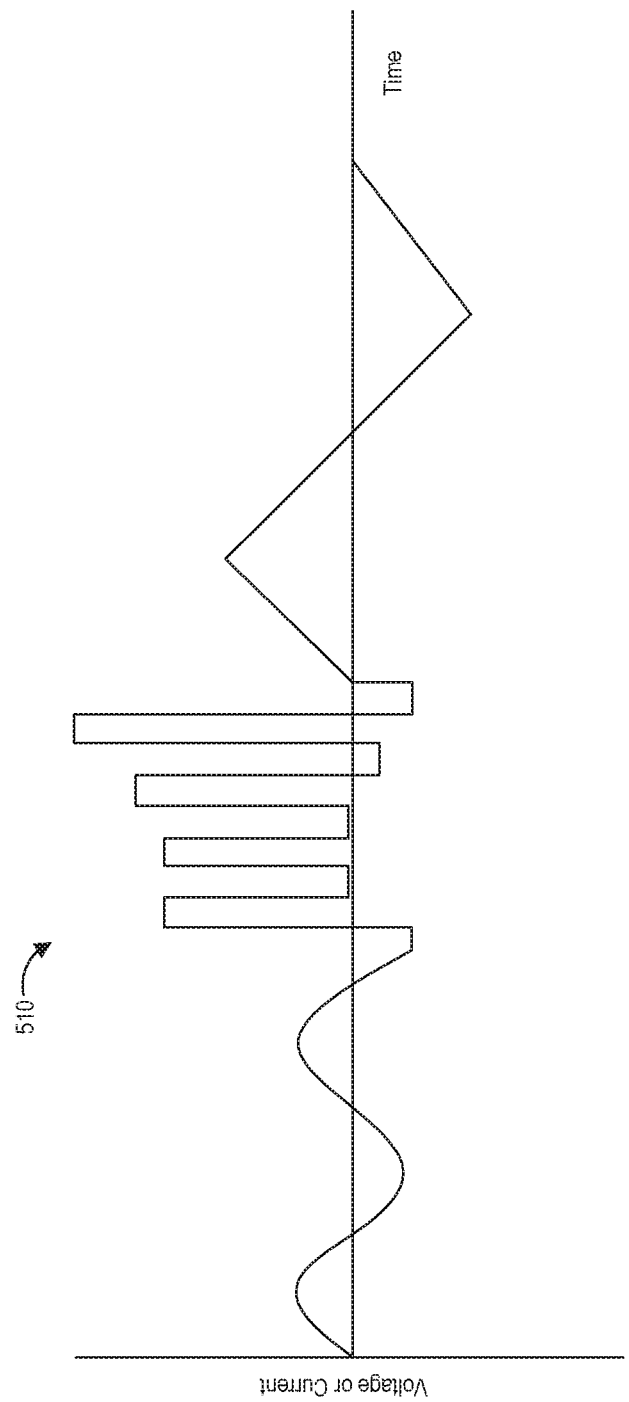
FIG. 5B illustrates an embodiment of a complex waveform that can be generated by the system of FIG. 1.

By incorporating either or both the loop waveform algorithm and/or the second-order waveform algorithm, embodiments of the controller 106 are able to produce complex waveforms that are highly complex as shown in FIG. 5B. As seen in FIG. 5B, the electrodeposition waveform 510, includes sinusoidal waveform portions, triangular waveform portions and square wave portions of different frequencies, amplitudes, and offsets. Prior art electrodeposition systems are not capable of dynamically creating or subsequently modifying such complex electrodeposition waveforms.

In the above embodiments, although one electrodeposition waveform signal 222 is shown being output from the controller 106, the waveform synthesizer circuit 208 and associated circuitry can provide a plurality of electrodeposition waveform signals, each of which can be connected via a separate controller output circuit 218 to respective electrodeposition power supplies that generate the respective electrodeposition waveforms. For example, in some embodiments, the controller 106 outputs up to eight waveform signals. Of course, depending on the application, the controller 106 can be configured to provide more than eight waveform signals. Because the FPGA circuit 216 can provide parallel processing, the control circuits in the FPGA circuit 216 can be configured to simultaneously and independently control the waveform synthesizer circuit 208 to generate each of the different electrodeposition waveforms. The electrodeposition waveform signals can all be the same, all different, or any combination thereof.

Figure 2B:
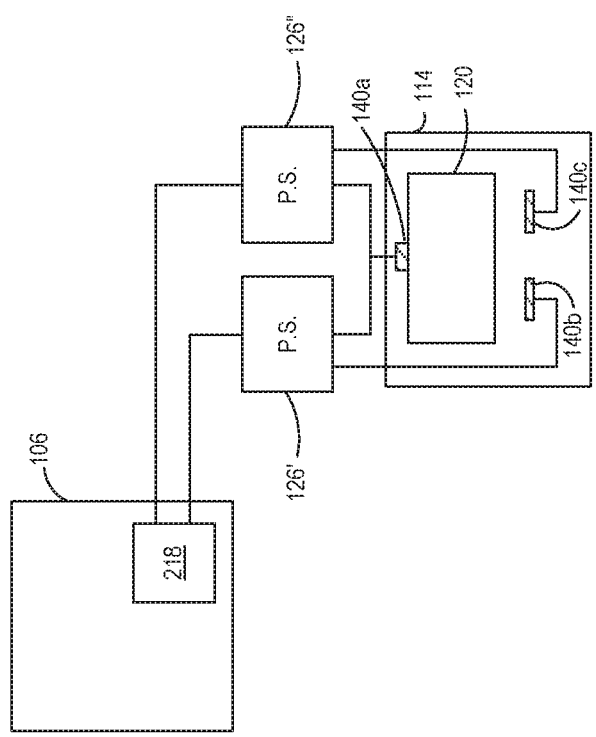
FIG. 2B illustrates another embodiment of a controller that can be used in the system of FIG. 1.

The plurality of electrodeposition waveforms can be transmitted to respective sets of electrodes that are disposed in the same tank, in respectively different tanks, or any combination thereof. For example, as shown in FIG. 2B, an electrodeposition power supply 126' is connected to a first set of electrodes 140a, 140b and an electrodeposition power supply 126" is connected to a second set of electrodes 140a, 140c. The controller 106 generates the electrodeposition waveform signals that are then transmitted to the respective power supplies 126' and 126" and thus controls the electrodeposition waveforms transmitted to the electrode sets. In some embodiments, the controller 106 simultaneously and independently controls the waveform parameters of the individual electrodeposition waveforms transmitted to the electrode sets (e.g., in order to account for variances in the process). For example, in some embodiments, the controller 106 is configured to simultaneously and independently control a current density, a voltage, a waveform phase, or combination thereof, of an electrodeposition waveform from power supply 126' to a set of electrodes 140a, 140b and control a current density, a voltage, a waveform phase, or combination thereof, of an electrodeposition waveform from power supply 126" to a set of electrodes 140a, 140c in the electrochemical processing tank 114.

By controlling the current densities, the voltages and/or the waveform phases of the respective electrodeposition waveforms, the deposition process on workpiece 120 can be adjusted or modified to compensate for variations in the electrodeposition process on the workpiece 120. For example, variations in the electrolyte concentration (e.g., from one end of the workpiece 120 to the other end, from the ends to the middle of workpiece 120, or variations in the process due to some other reason) can be compensated for by individually adjusting the current density, the voltage, and/or the waveform phase of the respective electrodeposition waveform transmitted to the set of electrodes 140a, 140b and 140a, 140c. These variations can be sensed by one or more sensors in, for example, sensor assembly 162, and/or these variations may be known to occur theoretically and/or by subsequent analysis of the workpiece. By compensating for these variations, the coating layers across workpiece 120 can be deposited evenly or be deposited to have any other desired layering profile.

The current densities, voltages, and/or the waveform phases, respectively, between the corresponding electrodeposition waveforms can be the same or different. Of course, the controlling of multiple electrode sets by the controller 106 is not limited to electrode sets in a single tank. In other embodiments, the controller controls a plurality of electrodeposition waveforms from respective power supplies to one or more sets of electrodes in different tanks (e.g., in systems where each tank has its own workpiece (e.g., see FIG. 1) and/or in systems where a workpiece or workpieces are transferred from one tank to another during the electrodeposition process). In such systems, the controller appropriately controls the current density, the voltage, and/or the waveform phase of each electrodeposition waveform to the respective electrode sets in order to ensure the workpiece(s) transferred from tank to tank and/or in the respective tanks have the desired layer profile. Of course, the adjustments in the current densities, voltages, and/or waveform phases between the electrode sets can be in addition to the electrodeposition waveform profile and current density adjustments discussed above. That is, along with modulating the electrodeposition waveform signal 222 based on the process step and/or feedback signal(s) as discussed above, in systems that provide more than one electrodeposition waveform signal to more than one set of electrodes, the electrodeposition waveform signal 222 can be further adjusted based on variations in the process between the electrode sets.

In the above embodiments that include a plurality of electrode sets, the controller 106 was configured to generate more than one electrodeposition waveform signal corresponding to each of the electrode sets. However, multiple controllers that communicate with each other via, for example, network 104 (see FIG. 1) can also provide the same functionality of adjusting for variances in the electrodeposition process. That is, the controllers 106, 108, 110 can communicate with each other to appropriately adjust the electrodeposition process in the respective tanks 114, 116, 118 to adjust for variances in the deposition process as discussed above.

In addition, along with controlling the waveform, the FPGA circuit 216 of controller 106 can be configured to simultaneously control other process devices such as, for example, the pump 132, agitator 170, control valve 156, etc. Because the FPGA circuit 216 can provide parallel processing, the control circuits in the FPGA circuit 216 can be configured to simultaneously and independently control each of the different electrodeposition waveforms and/or other control functions without adversely affecting the real-time processing capability of controller 106.

The following embodiments are included within the scope of the disclosure:

1. A system for depositing a layered nanolaminate alloy, comprising:
one or more electrochemical processing tanks, each electrochemical processing tank having one or more sets of electrodes for use in depositing multilayer nanolaminate coatings or claddings on one or more substrates;
one or more electrodeposition power supplies, each power supply respectively connected to a corresponding electrode set of the one or more sets of electrodes, each power supply having an analog input connection for receiving a complex waveform signal corresponding to a desired electrodeposition waveform to be output from the power supply, each power supply configured to amplify the received complex waveform signal to generate the desired electrodeposition waveform and transmit the desired electrodeposition waveform to the corresponding electrode set in the one or more sets of electrodes, each desired electrodeposition waveform from the corresponding power supply generating the deposition of at least one layer of the multilayer nanolaminate coatings or claddings on the corresponding substrate; and
a processor-based controller having
a waveform synthesizer circuit configured to generate each complex waveform signal to be transmitted to the analog input of the respective electrodeposition power supply, a synthesizer control circuit configured to control the waveform synthesizer circuit, the synthesizer control circuit, based at least in part on a recipe having information related to the depositing of the multilayer nanolaminate coatings or claddings, controlling the generating of the respective complex waveform signal by modulating in real-time at least one of a waveform shape, a frequency, an amplitude, an offset, a slew, a wavelength, a phase, a velocity, and a derivative of the complex waveform signal, and one or more controller output circuits respectively connected to the analog input of each electrodeposition power supply, each controller output circuit configured to transmit the corresponding complex waveform signal to the analog input of each electrodeposition power supply.

2. The system of embodiment 1, wherein the synthesizer control circuit includes a field-programmable gate array.

3. The system of embodiment 1, wherein the recipe is stored in the processor-based controller and wherein the recipe includes instructions for generating the respective electrodeposition waveform, wherein the instructions include at least one of a current density, a current waveform profile, and a voltage waveform profile of the respective electrodeposition waveform.

4. The system of embodiment 1, wherein the one or more sets of electrodes includes a cathode and one, two, three, four, or more anodes and wherein the processor-based controller transmits the desired electrodeposition waveform to the one or more sets of electrodes.

5. The system of embodiment 1, wherein the modulating in real-time at least one of a waveform shape, a frequency, an amplitude, an offset, a slew, a wavelength, a phase, a velocity, and a derivative of the complex waveform signal includes modulating one or more first characteristics of a base first-order waveform using one or more second characteristics of at least one other first-order waveform based on a functional relationship between the first and second characteristics to generate the respective complex waveform signal.

6. The system of embodiment 5, wherein the base first-order waveform and the at least one other first-order waveform are selected from a plurality of preloaded waveforms that are stored in the processor-based controller.

7. The system of embodiment 6, wherein two or more electrodeposition power supplies are connected to the processor-based controller and wherein the power supplies control individual portions of a cathode bus bar along a length of individual ones of the one or more electrochemical processing tanks.

8. The system of embodiment 5, wherein the first characteristics of the base first-order waveform and the second characteristics of the one or more other first-order waveforms include a waveform shape, a frequency, an amplitude, an offset, a slew, a wavelength, a phase, a velocity, or a derivative of the respective first-order waveform.

9. The system of embodiment 5, wherein the base first-order waveform is the respective complex waveform signal, and wherein the at least one other first-order waveform is selected from a plurality of preloaded waveforms that are stored in the processor-based controller.

10. The system of embodiment 1, wherein the modulating in real-time at least one of a waveform shape, a frequency, an amplitude, an offset, a slew, a wavelength, a phase, a velocity, and a derivative of the complex waveform signal includes serially combining sub-waveform sequences to generate the respective complex waveform signal.

11. The system of embodiment 10, wherein the serially combining sub-waveform sequences includes generating the sub-waveforms for a desired number of cycle counts and in a desired sequence order.

12. The system of embodiment 11, wherein at least one of the sub-waveform cycle count and the sub-waveform sequence order is dynamically modified based on at least one of a predetermined time period, a predetermined sub-waveform cycle count, a process step of the deposition of the nanolaminate coatings or claddings, and a feedback signal related to the deposition of the nanolaminate coatings or claddings.

13. The system of embodiment 12, wherein at least one of the sub-waveform cycle count and the sub-waveform sequence order is dynamically modified based on the feedback signal, and wherein the feedback signal relates to at least one of an electrolyte concentration, an electrolyte level, an electrolyte temperature, a coating thickness, and a coating resistance.

14. The system of embodiment 1, wherein the processor-based controller further includes a network communications circuit communicatively connected to an external communications network, and a communication input circuit operatively connected to the network communication circuit and configured to receive, from a remote computing device, the recipe.

15. The system of embodiment 14, further comprising:
one or more other processor-based controllers connected to the external communications network, wherein the processor-based controller is connected to the one or more other processor-based controllers via the external communications network and each of the processor-based controllers represents a node on the external communication network, and wherein the recipe from the remote computing device is received by each of the nodes of the external communication network.

16. The system of embodiment 14, further comprising:
one or more other processor-based controllers connected to the external communications network, wherein the processor-based controller is connected to the one or more other processor-based controllers via the external communications network and each of the processor-based controllers represents a node on the external communications network, and wherein the processor-based controller is further configured to transmit the instructions or a portion of the instructions in the recipe to the one or more other processor-based controllers via the external communications network.

17. The system of embodiment 2, wherein the processor-based controller is configured to generate a plurality of complex waveform signals and the field-programmable gate array includes parallel processing capability to simultaneously and independently control the waveform synthesizer circuit to generate each of the plurality of complex waveform signals.

18. The system of embodiment 17, wherein the processor-based controller is configured to adjust at least one of a current density, a voltage and a waveform phase of the respective desired electrodeposition waveform to compensate for variations in the deposition of the nanolaminate coatings or claddings on the corresponding substrate.

19. The system of embodiment 1, wherein the processor-based controller is configured to use a power supply driver file corresponding to at least one of the one or more electrodeposition power supplies to take into account at least one characteristic of the at least one of the one or more electrodeposition power supplies.

20. The system of embodiment 19, wherein the at least one characteristic includes at least one of a slew-rate and a percent overshoot.

21. The system of embodiment 19, wherein the power supply driver file is based on a calibration procedure performed by the processor-based controller on the at least one of the one or more electrodeposition power supplies, and wherein the calibration procedure includes transmitting a calibration waveform signal to the at least one of the one or more electrodeposition power supplies, placing a known load across output terminals of the at least one of the one or more electrodeposition power supplies, measuring at least one of a slew rate and a percent overshoot of the at least one of the one or more electrodeposition power supplies, and creating the power supply driver file using, at least in part, the measured results of the calibration procedure.

22. The system of embodiment 1, further comprising:
one or more tank automation controllers to control at least one of an electrolyte level, an electrolyte temperature, an agitation rate, and a flow rate of the respective electrochemical processing tank.

23. A controller for an electrodeposition process, comprising:
a waveform synthesizer circuit configured to generate a complex waveform signal corresponding to a desired electrodeposition waveform to be output from an electrodeposition power supply,
a synthesizer control circuit configured to control the waveform synthesizer circuit, the synthesizer control circuit, based at least in part on a recipe having information related to the electrodeposition process, controlling the generating of the complex waveform signal by modulating in real-time at least one of a waveform shape, a frequency, an amplitude, an offset, a slew, a wavelength, a phase, a velocity, and a derivative of the complex waveform signal, and
a controller output circuit configured to transmit the complex waveform signal to an analog input of the electrodeposition power supply.

24. The controller of embodiment 23, wherein the synthesizer control circuit includes a field-programmable gate array.

25. The controller of embodiment 23, wherein the recipe includes instructions for generating the electrodeposition waveform, and
wherein the instructions include at least one of a current density, a current waveform profile, and a voltage waveform profile of the electrodeposition waveform.

26. The controller of embodiment 23, wherein the recipe is stored in the controller.

27. The controller of embodiment 23, wherein the modulating in real-time at least one of a waveform shape, a frequency, an amplitude, an offset, a slew, a wavelength, a phase, a velocity, and a derivative of the complex waveform signal includes modulating one or more first characteristics of a base first-order waveform using one or more second characteristics of at least one other first-order waveform based on a functional relationship between the first and second characteristics to generate the complex waveform signal.

28. The controller of embodiment 27, wherein the base first-order waveform and the at least one other first-order waveform are selected from a plurality of preloaded waveforms that are stored in the controller.

29. The controller of embodiment 28, wherein the plurality of preloaded waveforms includes a triangular waveform, a sinewave, a square wave, or a custom waveform.

30. The controller of embodiment 27, wherein the first characteristics of the base first-order waveform and the second characteristics of the at least one other first-order waveform include a waveform shape, a frequency, an amplitude, an offset, a slew, a wavelength, a phase, a velocity, or a derivative of the respective first-order waveform.

31. The controller of embodiment 27, wherein the base first-order waveform is the complex waveform signal, and
wherein the at least one other first-order waveform is selected from a plurality of preloaded waveforms that are stored in the controller.

32. The controller of embodiment 23, wherein the modulating in real-time at least one of a waveform shape, a frequency, an amplitude, an offset, a slew, a wavelength, a phase, a velocity, and a derivative of the complex waveform signal includes serially combining sub-waveform sequences to generate the complex waveform signal.

33. The controller of embodiment 32, wherein the serially combining sub-waveform sequences includes generating the sub-waveforms for a desired number of cycle counts and in a desired sequence order.

34. The controller of embodiment 33, wherein at least one of the sub-waveform cycle count and the sub-waveform sequence order is dynamically modified based on at least one of a predetermined time period, a predetermined sub-waveform cycle count, a process step of the electrodeposition process, and a feedback signal related to the electrodeposition process.

35. The controller of embodiment 34, wherein at least one of the sub-waveform cycle count and the sub-waveform sequence order is dynamically modified based on the feedback signal, and
wherein the feedback signal relates to at least one of an electrolyte concentration, an electrolyte level, an electrolyte temperature, a coating thickness, and a coating resistance.

36. The controller of embodiment 23, wherein the controller further includes a network communications circuit communicatively connected to an external communications network, and a communication input circuit operatively connected to the network communications circuit and configured to receive, from a remote computing device, the recipe.

37. The controller of embodiment 36, wherein the controller is connected to one or more other controllers via the external communications network and each of the controllers represents a node on the external communications network.

38. The controller of embodiment 37, wherein the controller is further configured to transmit the instructions or a portion of the instructions in the recipe to the one or more other controllers via the external communications network.

39. The controller of embodiment 24, wherein the controller is configured to generate a plurality of complex waveform signals corresponding to a plurality of electrodeposition waveforms, and
wherein the field-programmable gate array includes parallel processing capability to simultaneously and independently control the waveform synthesizer circuit to generate each of the plurality of complex waveform signals.

40. The controller of embodiment 39, wherein the controller is configured to adjust at least one of a current density, a voltage, and a waveform phase of the respective electrodeposition waveform to compensate for variations in the electrodeposition process.

41. The controller of embodiment 23, wherein the controller is configured to use a power supply driver file corresponding to at least one of one or more electrodeposition power supplies to take into account at least one characteristic of the at least one of the one or more electrodeposition power supplies.

42. The controller of embodiment 41, wherein the at least one characteristic includes at least one of a slew-rate and a percent overshoot.

43. The controller of embodiment 41, wherein the power supply driver file is based on a calibration procedure performed by the controller on the at least one of the one or more electrodeposition power supplies, and wherein the calibration procedure includes transmitting a calibration waveform signal to the at least one of the one or more electrodeposition power supplies, placing a known load across output terminals of the at least one of the one or more electrodeposition power supplies, measuring at least one of a slew rate and a percent overshoot of the at least one of the one or more electrodeposition power supplies, and creating the power supply driver file using, at least in part, the measured results of the calibration procedure.

44. A method for electrodepositing a coating or cladding on a substrate, the method comprising:

selecting a standardized recipe corresponding to a desired electrodeposition process;

adjusting the standardized recipe based on information related to at least one of the substrate geometry, the substrate surface area, and an electrodeposition power supply used for electrodepositing the coating or cladding on the substrate;

generating a complex waveform signal corresponding to a desired electrodeposition waveform based on the adjusted recipe;

providing the complex waveform signal to the electrodeposition power supply;

generating an electrodeposition waveform in the power supply based on the complex waveform signal;

outputting the electrodeposition waveform from the power supply to an electrode set corresponding to the substrate; and depositing nanolaminate coatings or claddings on the substrate based on the electrodeposition waveform;

wherein the outputting includes modulating in real-time at least one of a waveform shape, a frequency, an amplitude, an offset, a slew, a wavelength, a phase, a velocity, and a derivative of the complex waveform signal based, at least in part, on a recipe having information related to the depositing of the nanolaminate coatings or claddings.

45. The method of embodiment 44, wherein the generation of the complex waveform signal includes synthesizing the complex waveform signal using a field-programmable gate array.

46. The method of embodiment 44, wherein the recipe includes instructions for generating the electrodeposition waveform, and wherein the instructions include at least one of a current density, a current waveform profile and a voltage waveform profile of the electrodeposition waveform.

47. The method of embodiment 44, wherein the modulating in real-time of at least one of a waveform shape, a frequency, an amplitude, an offset, a slew, a wavelength, a phase, a velocity, and a derivative of the complex waveform signal includes modulating one or more first characteristics of a base first-order waveform using one or more second characteristics of at least one other first-order waveform based on a functional relationship between the first and second characteristics to generate the complex waveform signal.

48. The method of embodiment 47, wherein the base first-order waveform and the at least one other first-order waveform are selected from a plurality of preloaded waveforms that are stored in the processor-based controller.

49. The method of embodiment 48, wherein the plurality of preloaded waveforms includes a triangular waveform, a sinewave, a square wave, or a custom waveform.

50. The method of embodiment 47, wherein the first characteristics of the base first-order waveform and the second characteristics of the one or more other first-order waveforms include a waveform shape, a frequency, an amplitude, an offset, a slew, a wavelength, a phase, a velocity, or a derivative of the respective first-order waveform.

51. The method of embodiment 47, wherein the base first-order waveform is the complex waveform signal, and wherein the at least one other first-order waveform is selected from a plurality of preloaded waveforms.

52. The method of embodiment 44, wherein the modulating in real-time of at least one of a waveform shape, a frequency, an amplitude, an offset, a slew, a wavelength, a phase, a velocity, and a derivative of the complex waveform signal includes serially combining sub-waveform sequences to generate the complex waveform signal.

53. The method of embodiment 52, wherein the serially combining sub-waveform sequences includes generating the sub-waveforms for a desired number of cycle counts and in a desired sequence order.

54. The method of embodiment 53, wherein at least one of the sub-waveform cycle count and the sub-waveform sequence order is dynamically modified based on at least one of a predetermined time period, a predetermined sub-waveform cycle count, a process step of the deposition of the coatings or claddings, and a feedback signal related to the deposition of the coatings or claddings.

55. The method of embodiment 54, wherein at least one of the sub-waveform cycle count and the sub-waveform sequence order is dynamically modified based on the feedback signal, and wherein the feedback signal relates to at least one of an electrolyte concentration, an electrolyte level, an electrolyte temperature, a coating thickness, and a coating resistance.

56. The method of embodiment 45, further comprising generating a plurality of complex waveform signals, wherein the field-programmable gate array includes parallel processing capability to simultaneously and independently generate each of the plurality of complex waveform signals.

57. The method of embodiment 44, wherein the generating of the complex waveform signal takes into account at least one characteristic of the electrodeposition power supply.

58. The method of embodiment 57, wherein the at least one characteristic includes at least one of a slew-rate and a percent overshoot.

59. A system, comprising:

an electrochemical processing tank;

a set of electrodes configured to be used in depositing a multilayer nanolaminate coatings on a workpiece;

an electrodeposition power supply connected to the set of electrodes, the electrodeposition power supply comprising an input connection configured to receive a complex waveform signal, the electrodeposition power supply configured to amplify the complex waveform signal to generate a desired electrodeposition waveform, the desired electrodeposition waveform configured to deposit at least one layer of the multilayer nanolaminate coating on the workpiece; and a processor-based controller comprising:

a waveform synthesizer circuit configured to generate the complex waveform signal;

a synthesizer control circuit configured to control the waveform synthesizer circuit based at least in part on a recipe having parameters related to the depositing at least one layer of the multilayer nanolaminate coating, the synthesizer control circuit configured to control the complex waveform signal generated by modulating in real-time a waveform shape, a frequency, an amplitude, an offset, a slew, a wavelength, a phase, a velocity, a derivative of the complex waveform signal, or a combination thereof; and a controller output circuit connected to the input of the electrodeposition power supply, the controller output circuit configured to transmit the complex waveform signal to the input.

60. A system, comprising:

an electrochemical processing tank;

a set of electrodes, in use, depositing a multilayer nanolaminate coatings on a workpiece;

an electrodeposition power supply connected to the set of electrodes, the electrodeposition power supply comprising an input connection that, in use, receives a complex waveform signal, the electrodeposition power supply, in use, amplifies the complex waveform signal to generate a desired electrodeposition waveform, wherein the desired electrodeposition waveform, in use, deposits at least one layer of the multilayer nanolaminate coating on the workpiece; and a processor-based controller comprising:

a waveform synthesizer circuit that, in use, generates the complex waveform signal;

a synthesizer control circuit that, in use, controls the waveform synthesizer circuit based at least in part on a recipe having parameters related to the depositing at least one layer of the multilayer nanolaminate coating, the synthesizer control circuit, in use, controlling the complex waveform signal generated by modulating in real-time a waveform shape, a frequency, an amplitude, an offset, a slew, a wavelength, a phase, a velocity, a derivative of the complex waveform signal, or a combination thereof; and a controller output circuit connected to the input of the electrodeposition power supply, wherein the controller output circuit, in use, transmits the complex waveform signal to the input.

61. A system, comprising:

an electrochemical processing tank;

a set of electrodes for use in depositing a multilayer nanolaminate coatings on a workpiece;

an electrodeposition power supply for amplifying a complex waveform signal to generate a desired electrodeposition waveform for depositing at least one layer of the multilayer nanolaminate coating on the workpiece, the electrodeposition power supply comprising an input connection for receiving the complex waveform signal; and a processor-based controller comprising:

a waveform synthesizer circuit for generating the complex waveform signal;

a synthesizer control circuit for controlling the waveform synthesizer circuit based at least in part on a recipe having parameters related to the depositing at least one layer of the multilayer nanolaminate coating, the synthesizer control circuit controlling the complex waveform signal generated by modulating in real-time a waveform shape, a frequency, an amplitude, an offset, a slew, a wavelength, a phase, a velocity, a derivative of the complex waveform signal, or a combination thereof; and a controller output circuit for transmitting the complex waveform signal to the input of the electrodeposition power supply.

62. The system of any one of embodiments 59 to 61, wherein the synthesizer control circuit comprises a field-programmable gate array.

63. The system of any one of embodiments 59 to 62, wherein the recipe is stored in the processor-based controller;

64. The system of any one of embodiments 59 to 63, wherein the recipe comprises instructions for generating the desired electrodeposition waveform; and wherein the instructions comprise a current density of the desired electrodeposition waveform, a current waveform profile of the desired electrodeposition waveform, a voltage waveform profile of the desired electrodeposition waveform, or a combination thereof.

65. The system of any one of embodiments 59 to 64, wherein the set of electrodes comprises a cathode and one, two, three, four, or more anodes.

66. The system of any one of embodiments 59 to 65, wherein the electrodeposition power supply is configured to transmit the desired electrodeposition waveform to the set of electrodes.

67. The system of any one of embodiments 59 to 65, wherein the electrodeposition power supply, in use, transmits the desired electrodeposition waveform to the set of electrodes.

68. The system of any one of embodiments 59 to 67, wherein the processor-based controller is configured to transmit the desired electrodeposition waveform to the set of electrodes.

69. The system of any one of embodiments 59 to 67, wherein the processor-based controller, in use, transmits the desired electrodeposition waveform to the set of electrodes.

70. The system of any one of embodiments 59 to 69, wherein the modulating in real-time comprises modulating a first characteristic of a base first-order waveform using a second characteristic of a second first-order waveform based on a functional relationship between the first characteristic and the second characteristic to generate the complex waveform signal.

71. The system of embodiment 70, wherein the base first-order waveform and the second first-order waveform are independently selected from a plurality of preloaded waveforms that are stored in the processor-based controller.

72. The system of embodiment 71, wherein the electrodeposition power supply is one of a plurality of electrodeposition power supplies that are connected to the processor-based controller.

73. The system of embodiment 73, wherein the plurality of electrodeposition power supplies independently control individual portions of a cathode bus bar positioned along at least a portion of a length the electrochemical processing tank.

74. The system of any one of embodiments 70 to 73, wherein the first characteristic of the base first-order waveform and the second characteristic of the second first-order waveform independently comprise a waveform shape, a frequency, an amplitude, an offset, a slew, a wavelength, a phase, a velocity, a derivative of the respective first-order waveform, or a combination thereof.

75. The system of embodiment 74, wherein the base first-order waveform is the complex waveform signal; and wherein the second first-order waveform is selected from a plurality of preloaded waveforms that are stored in the processor-based controller.

76. The system of any one of embodiments 59 to 75, wherein the modulating in real-time comprises serially combining sub-waveform sequences to generate the complex waveform signal.

77. The system of embodiment 76, wherein the modulating in real-time comprises generating the sub-waveform sequences for a desired number of cycle counts and in a desired sequence order.

78. The system of embodiment 77, wherein at least one of the desired number of cycle counts and the desired sequence order is independently dynamically modified based on a predetermined time period, a predetermined sub-waveform cycle count, a process step of the depositing at least one layer of the nanolaminate coating, a feedback signal related to the depositing at least one layer of the nanolaminate coating, or a combination thereof.

79. The system of embodiment 78, wherein at least one of the desired number of cycle counts and the desired sequence order is independently dynamically modified based on the feedback signal, and
wherein the feedback signal relates to an electrolyte concentration, an electrolyte level, an electrolyte temperature, a coating thickness, a coating resistance, or a combination thereof.

80. The system of any one of embodiments 59 to 79, wherein the processor-based controller further comprises a network communications circuit communicatively connected to an external communications network, the network communications circuit configured to receive the recipe from a remote computing device.

81. The system of any one of embodiments 59 to 79, wherein the processor-based controller further comprises a network communications circuit communicatively connected to an external communications network, the network communications circuit, in use, receives the recipe from a remote computing device.

82. The system of embodiment 80 or 81, further comprising one or more other processor-based controllers configured to be connected to the external communications network;
wherein the processor-based controller is configured to be connected to the one or more other processor-based controllers via the external communications network; and
wherein each of the processor-based controllers represents a node on the external communications network.

83. The system of embodiment 80 or 81, further comprising one or more other processor-based controllers that, in use, are connected to the external communications network;
wherein the processor-based controller, in use, is connected to the one or more other processor-based controllers via the external communications network; and
wherein each of the processor-based controllers represents a node on the external communications network.

84. The system of embodiment 82 or 83, wherein each node of the external communications network is configured to receive the recipe.

85. The system of embodiment 82 or 83, wherein each node of the external communications network, in use, receives the recipe.

86. The system of any one of embodiments 82 to 85, wherein the processor-based controller is further configured to transmit at least a portion of the instructions of the recipe to the one or more other processor-based controllers via the external communications network.

87. The system of any one of embodiments 82 to 85, wherein the processor-based controller, in use, transmits at least a portion of the instructions of the recipe to the one or more other processor-based controllers via the external communications network.

88. The system of any one of embodiments 62 to 87, wherein the processor-based controller is configured to generate a plurality of complex waveform signals and the field-programmable gate array has parallel processing capability to simultaneously and independently control the waveform synthesizer circuit to generate each of the plurality of complex waveform signals.

89. The system of any one of embodiments 62 to 77, wherein the processor-based controller, in use, generates a plurality of complex waveform signals and the field-programmable gate array has parallel processing capability to simultaneously and independently control the waveform synthesizer circuit to generate each of the plurality of complex waveform signals.

90. The system of embodiment 88 or 89, wherein the processor-based controller is configured to adjust a current density, a voltage, a waveform phase, or a combination thereof, of the desired electrodeposition waveform to compensate for variations in the deposition of the at least one layer of the nanolaminate coating on the workpiece.

91. The system of embodiment 88 or 89, wherein the processor-based controller, in use, compensates for variations in the deposition of the at least one layer of the nanolaminate coating on the workpiece by adjusting a current density, a voltage, a waveform phase, or a combination thereof, of the desired electrodeposition waveform.

92. The system of any one of embodiments 59 to 91, wherein the processor-based controller is configured to use a power supply driver file corresponding to the electrodeposition power supply to take into account a characteristic of the electrodeposition power supply.

93. The system of any one of embodiments 59 to 91, wherein the processor-based controller, in use, uses a power supply driver file corresponding to the electrodeposition power supply to take into account a characteristic of the electrodeposition power supply.

94. The system of embodiment 92 or 93, wherein the characteristic of the electrodeposition power supply comprises a slew-rate, a percent overshoot, or a combination thereof.

95. The system of embodiment 92 or 93, wherein the power supply driver file is based on a calibration procedure performed on the electrodeposition power supply by the processor-based controller.

96. The system of embodiment 95, wherein the calibration procedure comprises:
transmitting a calibration waveform signal to the electrodeposition power supply;
placing a known load across output terminals of the electrodeposition power supply;
measuring a slew rate, a percent overshoot, or a combination thereof, of the electrodeposition power supply; and
creating the power supply driver file using at least results of the measuring the slew rate, the percent overshoot, or the combination thereof.

97. The system of any one of embodiments 59 to 96, further comprising a tank automation controller configured to control an electrolyte level, an electrolyte temperature, an agitation rate, a flow rate of the respective electrochemical processing tank, or a combination thereof.

98. The system of any one of embodiments 59 to 96, further comprising a tank automation controller that, in use, controls an electrolyte level, an electrolyte temperature, an agitation rate, a flow rate of the respective electrochemical processing tank, or a combination thereof.

99. The system of embodiment 59 to 98, further comprising a sensor assembly configured to detect temperature, level, electrolyte concentration, coating thickness, coating resistivity, voltage or current between the electrodes, agitation rate, or a combination thereof.

100. The system of embodiment 59 to 98, further comprising a sensor assembly that, in use, detects temperature, level, electrolyte concentration, coating thickness, coating resistivity, voltage or current between the electrodes, agitation rate, or a combination thereof.

101. The system of embodiment 99 or 100, wherein the sensor assembly is configured to provide a feedback signal to the processor-based controller.

102. The system of embodiment 99 or 100, wherein the sensor assembly, in use, provides a feedback signal to the processor-based controller.

103. The system of embodiment 101 or 102, wherein the modulating in real-time comprises adjusting the waveform shape, the frequency, the amplitude, the offset, the slew, the wavelength, the phase, the velocity, the derivative of the complex waveform signal, or the combination thereof in response to receiving the feedback signal.

104. The system of any one of embodiment 99 or 100, wherein the sensor assembly is configured to provide a feedback signal to the tank automation controller.

105. The system of any one of embodiment 99 or 100, wherein the sensor assembly, in use, provides a feedback signal to the tank automation controller.

106. The system of embodiment 104 or 105, wherein the tank automation controller is configured to provide the feedback signal to the processor-based controller.

107. The system of embodiment 104 or 105, wherein the tank automation controller, in use, provides the feedback signal to the processor-based controller.

108. The system of any one of embodiments 97 to 107, wherein the tank automation controller is configured to adjust the electrolyte level, the electrolyte temperature, the agitation rate, the flow rate of the respective electrochemical processing tank, or the combination thereof in response to receiving the feedback signal.

109. The system of any one of embodiments 97 to 107, wherein the tank automation controller, in use, adjusts the electrolyte level, the electrolyte temperature, the agitation rate, the flow rate of the respective electrochemical processing tank, or the combination thereof in response to receiving the feedback signal.

110. The system of any one of embodiments 59 to 109, wherein the processor-based controller has a sample rate ranging from DC to about 350 KHz.

111. The system of any one of embodiments 59 to 110, wherein the electrodeposition power supply has a switching speed of about 5 milliseconds or less.

112. A controller for an electrodeposition process, comprising:
a waveform synthesizer circuit configured to generate a complex waveform signal corresponding to an electrodeposition waveform, the waveform synthesizer circuit being further configured to transmit the complex waveform signal to an electrodeposition power supply;
a synthesizer control circuit configured to control the waveform synthesizer circuit based at least in part on a recipe having parameters related to depositing at least one layer of a multilayer nanolaminate coating, the synthesizer control circuit configured to control the complex waveform signal generated by modulating in real-time a waveform shape, a frequency, an amplitude, an offset, a slew, a wavelength, a phase, a velocity, a derivative of the complex waveform signal, or a combination thereof; and
a controller output circuit configured to transmit the complex waveform signal to an input of the electrodeposition power supply.

113. A controller for an electrodeposition process, comprising:
a waveform synthesizer circuit that, in use, generates a complex waveform signal corresponding to an electrodeposition waveform and transmits the complex waveform signal to an electrodeposition power supply;
a synthesizer control circuit that, in use, controls the waveform synthesizer circuit based at least in part on a recipe having parameters related to depositing at least one layer of a multilayer nanolaminate coating, wherein the synthesizer control circuit, in use, controls the complex waveform signal generated by modulating in real-time a waveform shape, a frequency, an amplitude, an offset, a slew, a wavelength, a phase, a velocity, a derivative of the complex waveform signal, or a combination thereof; and
a controller output circuit that, in use, transmits the complex waveform signal to an input of the electrodeposition power supply.

114. A controller for an electrodeposition process, comprising:
a waveform synthesizer circuit that, in use, generates a complex waveform signal corresponding to an electrodeposition waveform and transmits the complex waveform signal to an electrodeposition power supply;
a synthesizer control circuit that, in use, controls the waveform synthesizer circuit based at least in part on a recipe having parameters related to depositing at least one layer of a multilayer nanolaminate coating, wherein the synthesizer control circuit, in use, controls the complex waveform signal generated by modulating in real-time a waveform shape, a frequency, an amplitude, an offset, a slew, a wavelength, a phase, a velocity, a derivative of the complex waveform signal, or a combination thereof; and
a controller output circuit that, in use, transmits the complex waveform signal to an input of the electrodeposition power supply.

115. The controller of any one of embodiments 112 to 114, wherein the synthesizer control circuit comprises a field-programmable gate array.

116. The controller of any one of embodiments 112 to 115, wherein the recipe comprises instructions for generating the electrodeposition waveform; and
wherein the instructions comprise a current density of the electrodeposition waveform, a current waveform profile of the electrodeposition waveform, a voltage waveform profile of the electrodeposition waveform, or a combination thereof.

117. The controller of any one of embodiments 112 to 116, wherein the recipe is stored in the controller.

118. The controller of any one of embodiments 112 to 117, wherein the modulating in real-time comprises modulating a first characteristic of a base first-order waveform using a second characteristic of a second first-order waveform based on a functional relationship between the first and second characteristics to generate the complex waveform signal.

119. The controller of embodiment 118, wherein the base first-order waveform and the second first-order waveform are independently selected from a plurality of preloaded waveforms that are stored in the controller.

120. The controller of embodiment 119, wherein the plurality of preloaded waveforms comprises a triangular waveform, a sinewave, a square wave, or a custom waveform.

121. The controller of embodiment 118 to 120, wherein the first characteristic of the base first-order waveform and the second characteristic of the second first-order waveform independently comprise a waveform shape, a frequency, an amplitude, an offset, a slew, a wavelength, a phase, a velocity, a derivative of the respective first-order waveform, or a combination thereof.

122. The controller of embodiment 118, wherein the base first-order waveform is the complex waveform signal, and wherein the second first-order waveform is selected from a plurality of preloaded waveforms that are stored in the controller.

123. The controller of any one of embodiments 112 to 122, wherein the modulating in real-time comprises serially combining sub-waveform sequences to generate the complex waveform signal.

124. The controller of embodiment 123, wherein the modulating in real time comprises generating the sub-waveform sequences for a sub-waveform cycle count and in a sub-waveform sequence order.

125. The controller of embodiment 124, wherein at least one of the sub-waveform cycle count and the sub-waveform sequence order is independently dynamically modified based on a predetermined time period, a predetermined sub-waveform cycle count, a process step of the electrodeposition process, a feedback signal related to the electrodeposition process, or a combination thereof.

126. The controller of embodiment 125, wherein at least one of the sub-waveform cycle count and the sub-waveform sequence order is independently dynamically modified based on the feedback signal; and wherein the feedback signal relates to an electrolyte concentration, an electrolyte level, an electrolyte temperature, a coating thickness, a coating resistance, or a combination thereof.

127. The controller of any one of embodiments 112 to 126, further comprising a network communications circuit communicatively connected to an external communications network, the network communications circuit configured to receive the recipe via the external communications network.

128. The controller of any one of embodiments 112 to 126, further comprising a network communications circuit communicatively connected to an external communications network, the network communications circuit, in use, receives the recipe via the external communications network.

129. The controller of embodiment 127 or 128, wherein the external communications network is connected to one or more other controllers and each of the one or more other controllers represents a node on the external communications network.

130. The controller of embodiment 129, wherein the network communication circuit is configured to transmit at least a portion of the instructions of the recipe to the one or more other controllers via the external communications network.

131. The controller of embodiment 129, wherein the network communication circuit, in use, transmits at least a portion of the instructions of the recipe to the one or more other controllers via the external communications network.

132. The controller of any one of embodiments 115 to 131, wherein the controller is configured to generate a plurality of complex waveform signals corresponding to a plurality of electrodeposition waveforms; and wherein the field-programmable gate array comprises parallel processing capability to simultaneously and independently control the waveform synthesizer circuit to generate each of the plurality of complex waveform signals.

133. The controller of any one of embodiments 115 to 131, wherein the controller, in use, generates a plurality of complex waveform signals corresponding to a plurality of electrodeposition waveforms; and wherein the field-programmable gate array comprises parallel processing capability to simultaneously and independently control the waveform synthesizer circuit to generate each of the plurality of complex waveform signals.

134. The controller of embodiment 132 or 133, wherein the controller is configured to adjust a current density, a voltage, a waveform phase, or a combination thereof, of the respective electrodeposition waveform to compensate for variations in the electrodeposition process.

135. The controller of embodiment 132 or 133, wherein the controller, in use, adjusts a current density, a voltage, a waveform phase, or a combination thereof, of the respective electrodeposition waveform to compensate for variations in the electrodeposition process.

136. The controller of any one of embodiments 112 to 135, wherein the controller is configured to use a power supply driver file corresponding to the electrodeposition power supply to take into account a characteristic of the electrodeposition power supply.

137. The controller of any one of embodiments 112 to 135, wherein the controller, in use, uses a power supply driver file corresponding to the electrodeposition power supply to take into account a characteristic of the electrodeposition power supply.

138. The controller of embodiment 136 or 137, wherein the characteristic comprises a slew-rate, a percent overshoot, or a combination thereof.

139. The controller of any one of embodiments 136 to 138, wherein the power supply driver file is based on a calibration procedure performed by the controller on the electrodeposition power supply.

140. The controller of embodiment 139, wherein the calibration procedure comprises:

transmitting a calibration waveform signal to the electrodeposition power supply;

placing a known load across output terminals of the electrodeposition power supply;

measuring a slew rate, a percent overshoot, or a combination thereof, of the electrodeposition power supply; and creating the power supply driver file using at least results of the measuring the slew rate, the percent overshoot, or the combination thereof.

141. The controller of any one of embodiments 112 to 140, wherein the modulating in real-time comprises adjusting the waveform shape, the frequency, the amplitude, the offset, the slew, the wavelength, the phase, the velocity, the derivative of the complex waveform signal, or the combination thereof in response to receiving the feedback signal from a sensor assembly.

142. The controller of any one of embodiments 112 to 141, wherein the controller is configured to transmit the electrodeposition waveform to a set of electrodes.

143. The controller of any one of embodiments 112 to 142, wherein the controller, in use, transmits the electrodeposition waveform to a set of electrodes.

144. The controller of any one of embodiments 112 to 143, wherein the controller has a sample rate ranging from DC to about 350 KHz.

145. A method for electrodepositing a coating on a workpiece, the method comprising:

selecting a recipe corresponding to a electrodeposition process;

producing a specialized recipe by adjusting the recipe based on information related to workpiece geometry, workpiece surface area, an electrodeposition power supply, or a combination thereof;

generating a complex waveform signal corresponding to a desired electrodeposition waveform that is based on the adjusted recipe, the generating comprising modulating in real-time a waveform shape, a frequency, an amplitude, an offset, a slew, a wavelength, a phase, a velocity, a derivative of the complex waveform signal, or a combination thereof, based at least on the recipe;

providing the complex waveform signal to the electrodeposition power supply;

generating an electrodeposition waveform based on the complex waveform signal by the power supply; and transmitting the electrodeposition waveform to an electrode set in an electrodeposition processing tank, thereby depositing the coating on the workpiece.

146. The method of embodiment 145, wherein the complex waveform signal is generated using a field-programmable gate array.

147. The method of embodiment 145 or 146, wherein the recipe comprises instructions for generating the electrodeposition waveform, and wherein the instructions comprise at least one of a current density of the electrodeposition waveform, a current waveform profile of the electrodeposition waveform, a voltage waveform profile of the electrodeposition waveform, or a combination thereof.

148. The method of any one of embodiments 145 to 147, wherein the generating the complex waveform signal comprises modulating a first characteristic of a base first-order waveform using a second characteristic of a second first-order waveform based on a functional relationship between the first and second characteristics.

149. The method of embodiment 148, wherein the base first-order waveform and the second first-order waveform are independently selected from a plurality of preloaded waveforms that are stored in a processor-based controller.

150. The method of embodiment 149, wherein the plurality of preloaded waveforms comprises a triangular waveform, a sinewave, a square wave, or a custom waveform.

151. The method of any one of embodiments 148 to 150, wherein the first characteristic of the base first-order waveform and the second characteristic of the second first-order waveform independently comprise a waveform shape, a frequency, an amplitude, an offset, a slew, a wavelength, a phase, a velocity, a derivative of the first-order waveform, or a combination thereof.

152. The method of any one of embodiments 148 to 151, wherein the base first-order waveform is the complex waveform signal; and wherein the second first-order waveform is selected from a plurality of preloaded waveforms.

153. The method of any one of embodiments 145 to 152, wherein the generating the complex waveform signal comprises serially combining sub-waveform sequences.

154. The method of embodiment 153, wherein the serially combining sub-waveform sequences comprises generating the sub-waveforms for a sub-waveform cycle count and in a sub-waveform sequence order.

155. The method of embodiment 154, wherein the sub-waveform cycle count, the sub-waveform sequence order, or a combination thereof, is independently dynamically modified based on a predetermined time period, a predetermined sub-waveform cycle count, a process step of the depositing the coating, a feedback signal related to the depositing the coating, or a combination thereof.

156. The method of embodiment 155, wherein the sub-waveform cycle count, the sub-waveform sequence order, or a combination thereof, is independently dynamically modified based on the feedback signal, and wherein the feedback signal relates to an electrolyte concentration, an electrolyte level, an electrolyte temperature, a coating thickness, a coating resistance, or a combination thereof.

157. The method of any one of embodiments 146 to 156, further comprising generating a plurality of complex waveform signals by the field-programmable gate array, which has parallel processing capability to simultaneously and independently generate each of the plurality of complex waveform signals.

158. The method of any one of embodiments 145 to 157, wherein the generating the complex waveform signal takes into account a characteristic of the electrodeposition power supply.

159. The method of embodiment 158, wherein the characteristic comprises a slew-rate, a percent overshoot, or a combination thereof.

160. The method of any one of embodiments 145 to 159, further comprising detecting, by a sensor assembly, temperature, level, electrolyte concentration, coating thickness, coating resistivity, voltage or current between the electrodes, agitation rate, or a combination thereof.

161. The method of embodiment 160, further comprising providing, by the sensor assembly, a feedback signal to the processor-based controller.

162. The method of embodiment 161, wherein the modulating in real-time comprises adjusting the waveform shape, the frequency, the amplitude, the offset, the slew, the wavelength, the phase, the velocity, the derivative of the complex waveform signal, or the combination thereof in response to receiving the feedback signal.

163. The method of embodiment 160, further comprising providing, by the sensor assembly, a feedback signal to the tank automation controller.

164. The method of embodiment 163, further comprising providing, by the tank automation controller, the feedback signal to the processor-based controller.

165. The method of embodiment 160, further comprising adjusting, by the tank automation controller, the electrolyte level, the electrolyte temperature, the agitation rate, the flow rate of the respective electrochemical processing tank, or the combination thereof in response to receiving the feedback signal.

166. The method of any one of embodiments 145 to 165, wherein the electrodeposition waveform is transmitted from the power supply to the electrode set.

167. The method of any one of embodiments 149 to 165, wherein the electrodeposition waveform is transmitted from the processor-based controller to the electrode set.

168. The method of any one of embodiments 149 to 167, wherein the processor-based controller has a sample rate ranging from DC to about 350 KHz.

169. The method of any one of embodiments 145 to 168, wherein the electrodeposition power supply has a switching speed of about 5 milliseconds or less.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including U.S. Patent Application No. 62/394,552, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

Accordingly, the claims are not limited by the disclosure.

What is claimed is:

1. A system, comprising:
an electrochemical processing tank;
a set of electrodes configured for depositing a multilayer nanolaminate coating on a workpiece;
an electrodeposition power supply connected to the set of electrodes, the electrodeposition power supply comprising an input connection configured to receive a complex waveform signal, the electrodeposition power supply configured to amplify the complex waveform signal to generate a desired electrodeposition waveform, the desired electrodeposition waveform configured to deposit at least one layer of the multilayer nanolaminate coating on the workpiece;
a sensor assembly configured to generate a feedback signal related to the depositing at least one layer of the multilayer nanolaminate coating, wherein the feedback signal relates to an electrolyte concentration, an electrolyte level, an electrolyte temperature, a coating thickness, a coating resistance, or a combination thereof; and
a processor-based controller comprising:
a waveform synthesizer circuit configured to generate the complex waveform signal;
a synthesizer control circuit configured to:
adjust a waveform profile, a time duration, and/or an amp-hour accumulation of a recipe based on inputted geometry and size of the workpiece, the recipe having parameters related to the depositing at least one layer of the multilayer nanolaminate coating; and
control the waveform synthesizer circuit based at least on the recipe and the feedback signal from the sensor assembly, the synthesizer control circuit configured to control the complex waveform signal generated by modulating in real-time a waveform shape, a frequency, an amplitude, an offset, a slew, a wavelength, a phase, a velocity, a derivative of the complex waveform signal, or a combination thereof; and
a controller output circuit connected to the input of the electrodeposition power supply, the controller output circuit configured to transmit the complex waveform signal to the input,
wherein the recipe comprises instructions for generating the desired electrodeposition waveform; and
wherein the instructions comprise a current density of the desired electrodeposition waveform, a current waveform profile of the desired electrodeposition waveform, a voltage waveform profile of the desired electrodeposition waveform, or a combination thereof.

2. The system of claim 1, wherein the modulating in real-time comprises modulating a first characteristic of a base first-order waveform using a second characteristic of a second first-order waveform based on a functional relationship between the first characteristic and the second characteristic to generate the complex waveform signal.

3. The system of claim 2, wherein the base first-order waveform and the second first-order waveform are independently selected from a plurality of preloaded waveforms that are stored in the processor-based controller, and
wherein the first characteristic of the base first-order waveform and the second characteristic of the second first-order waveform independently comprise a waveform shape, a frequency, an amplitude, an offset, a slew, a wavelength, a phase, a velocity, a derivative of the respective first-order waveform, or a combination thereof, the base first-order waveform and the second first-order waveform having different waveform shapes.

4. The system of claim 1, wherein the electrodeposition power supply is one of a plurality of electrodeposition power supplies that are connected to the processor-based controller; and
wherein the plurality of electrodeposition power supplies independently control individual portions of a cathode bus bar positioned along at least a portion of a length of the electrochemical processing tank.

5. The system of claim 1, wherein the modulating in real-time comprises serially combining sub-waveform sequences of different waveform shapes to generate the complex waveform signal.

6. The system of claim 5, wherein the modulating in real-time comprises generating the sub-waveform sequences for a desired number of cycle counts and in a desired sequence order,
wherein at least one of the desired number of cycle counts and the desired sequence order is independently dynamically modified based on a predetermined time period, a predetermined sub-waveform cycle count, a process step of the depositing at least one layer of the nanolaminate coating, the feedback signal related to the depositing at least one layer of the nanolaminate coating, or a combination thereof.

7. The system of claim 1, wherein the processor-based controller further comprises a network communications circuit communicatively connected to an external communications network, the network communications circuit configured to receive the recipe from a remote computing device.

8. The system of claim 7, further comprising one or more other processor-based controllers configured to be connected to the external communications network;

wherein the processor-based controller is configured to be connected to the one or more other processor-based controllers via the external communications network; and wherein each of the processor-based controllers represents a node on the external communications network.

9. The system of claim 1, wherein the processor-based controller is configured to generate a plurality of complex waveform signals, and the synthesizer control circuit comprises a field-programmable gate array having parallel processing capability to simultaneously and independently control the waveform synthesizer circuit to generate each of the plurality of complex waveform signals.

10. The system of claim 1, wherein the processor-based controller is configured to adjust a current density, a voltage, a waveform phase, or a combination thereof, of the desired electrodeposition waveform to compensate for variations in the deposition of the at least one layer of the nanolaminate coating on the workpiece.

11. The system of claim 1, wherein the processor-based controller is configured to use a power supply driver file corresponding to the electrodeposition power supply to take into account a characteristic of the electrodeposition power supply.

12. The system of claim 11, wherein the power supply driver file is based on a calibration procedure performed on the electrodeposition power supply by the processor-based controller; and
wherein the calibration procedure comprises:
transmitting a calibration waveform signal to the electrodeposition power supply;
placing a known load across output terminals of the electrodeposition power supply;
measuring a slew rate, a percent overshoot, or a combination thereof, of the electrodeposition power supply; and
creating the power supply driver file using at least results of the measuring the slew rate, the percent overshoot, or the combination thereof.

13. The system of claim 1, further comprising a tank automation controller configured to control an electrolyte level, an electrolyte temperature, an agitation rate, a flow rate of the respective electrochemical processing tank, or a combination thereof.

14. A controller for an electrodeposition process, comprising:
a waveform synthesizer circuit configured to generate a complex waveform signal corresponding to an electrodeposition waveform, the waveform synthesizer circuit being further configured to transmit the complex waveform signal to an electrodeposition power supply;
a synthesizer control circuit configured to:
adjust a waveform profile, a time duration, and/or an amp-hour accumulation of a recipe based on inputted geometry and size of the a workpiece, the recipe having parameters related to depositing at least one layer of a multilayer nanolaminate coating on the workpiece; and
control the waveform synthesizer circuit based at least in-part-on the recipe and a feedback signal relating to an electrolyte concentration, an electrolyte level, an electrolyte temperature, a coating thickness, a coating resistance, or a combination thereof, the synthesizer control circuit configured to control the complex waveform signal generated by modulating in real-time a waveform shape, a frequency, an amplitude, an offset, a slew, a wavelength, a phase, a velocity, a derivative of the complex waveform signal, or a combination thereof; and
a controller output circuit configured to transmit the complex waveform signal to an input of the electrodeposition power supply,
wherein the recipe comprises instructions for generating the electrodeposition waveform; and
wherein the instructions comprise a current density of the electrodeposition waveform, a current waveform profile of the electrodeposition waveform, a voltage waveform profile of the desired-electrodeposition waveform, or a combination thereof.

15. A method for electrodepositing a coating on a workpiece, the method comprising:
selecting a recipe corresponding to an electrodeposition process;
producing a specialized recipe by adjusting the recipe based on information related to workpiece geometry, workpiece surface area, and an electrodeposition power supply;
generating a complex waveform signal with a processor-based controller, the complex waveform signal corresponding to a desired electrodeposition waveform that is based on the adjusted recipe, the generating comprising modulating in real-time a waveform shape, a frequency, an amplitude, an offset, a slew, a wavelength, a phase, a velocity, a derivative of the complex waveform signal, or a combination thereof, based at least on the recipe;
providing the complex waveform signal from the processor-based controller to the electrodeposition power supply;
generating an electrodeposition waveform based on the complex waveform signal by the electrodeposition power supply;
transmitting the electrodeposition waveform to an electrode set in an electrodeposition processing tank, thereby depositing the coating on the workpiece;
monitoring a feedback signal related to the depositing the coating on the workpiece, wherein the feedback signal relates to an electrolyte concentration, an electrolyte level, an electrolyte temperature, a coating thickness, a coating resistance, or a combination thereof; and
modifying the electrodeposition waveform based on the feedback signal by modulating in real-time a waveform shape, a frequency, a amplitude, a offset, a slew, a wavelength, a phase, a velocity, a derivative of the complex waveform signal, or a combination thereof.

16. The method of claim 15, wherein the recipe comprises instructions for generating the electrodeposition waveform, and
wherein the instructions comprise at least one of a current density of the electrodeposition waveform, a current waveform profile of the electrodeposition waveform, a voltage waveform profile of the electrodeposition waveform, or a combination thereof.

17. The method of claim 15, wherein the generating the complex waveform signal comprises modulating a first characteristic of a base first-order waveform using a second characteristic of a second first-order waveform based on a functional relationship between the first and second characteristics.

18. The method of claim 17, wherein the base first-order waveform and the second first-order waveform are independently selected from a plurality of preloaded waveforms that are stored in a processor-based controller, wherein the first characteristic of the base first-order waveform and the second characteristic of the second first-order waveform independently comprise a waveform shape, a frequency, an amplitude, an offset, a slew, a wavelength, a phase, a velocity, a derivative of the first-order waveform, or a combination thereof, the base first-order waveform and the second first-order waveform having different shapes.

19. The method of claim 15, wherein the generating the complex waveform signal comprises serially combining sub-waveform sequences of different waveform shapes.

20. The method of claim 19, wherein the serially combining sub-waveform sequences comprises generating the sub-waveforms for a sub-waveform cycle count and in a sub-waveform sequence order,
   wherein the sub-waveform cycle count, the sub-waveform sequence order, or a combination thereof, is independently dynamically modified based on a predetermined time period, a predetermined sub-waveform cycle count, a process step of the depositing the coating, the feedback signal related to the depositing the coating, or a combination thereof.

21. The method of claim 15, further comprising generating a plurality of complex waveform signals by a field-programmable gate array in the processor based controller, which has parallel processing capability to simultaneously and independently generate each of the plurality of complex waveform signals.

22. The method of claim 15, wherein the generating the complex waveform signal takes into account a characteristic of the electrodeposition power supply, wherein the characteristic comprises a slew-rate, a percent overshoot, or a combination thereof.

* * * * *

UNITED STATES PATENT AND TRADEMARK OFFICE
CERTIFICATE OF CORRECTION

PATENT NO. : 12,077,876 B2
APPLICATION NO. : 17/409688
DATED : September 3, 2024
INVENTOR(S) : Leslie Ann Collinson et al.

Page 1 of 1

It is certified that error appears in the above-identified patent and that said Letters Patent is hereby corrected as shown below:

In the Claims

Column 45, Claim 14, Line 57:
"size of the a workpiece," should read: --size of a workpiece,--.

Column 45, Claim 14, Lines 60-61:
"at least in-part-on the recipe" should read: --at least on the recipe--.

Column 46, Claim 14, Line 12:
"of the desired-electrodeposition" should read: --of the electrodeposition--.

Signed and Sealed this
Twenty-ninth Day of October, 2024

Katherine Kelly Vidal
*Director of the United States Patent and Trademark Office*